(12) United States Patent
Rayner

(10) Patent No.: US 6,444,737 B1
(45) Date of Patent: Sep. 3, 2002

(54) WATER-DISPERSED POLYMER STABILIZER

(75) Inventor: Terry J. Rayner, London (CA)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/543,120

(22) Filed: Apr. 5, 2000

(51) Int. Cl.⁷ .............................. C08K 5/29; C08K 5/17; C08K 3/22; C08K 5/057

(52) U.S. Cl. ...................... 524/195; 524/247; 524/249; 524/424; 524/436; 524/724; 524/839; 564/2; 564/252; 564/503; 252/182.29; 252/403; 252/405

(58) Field of Search ...................... 252/182.29, 403, 252/405; 524/195, 247, 249, 424, 436, 724, 839; 564/2, 252, 503

(56) References Cited

U.S. PATENT DOCUMENTS

| | | | |
|---|---|---|---|
| 3,417,043 A | * 12/1968 | Polestak et al. ............ 524/247 |
| 3,556,829 A | * 1/1971 | Gebura | |
| 3,627,742 A | * 12/1971 | Kruse | |
| 3,864,468 A | 2/1975 | Hyman et al. ................ 424/16 |
| 4,086,297 A | 4/1978 | Rei et al. .................... 260/859 |
| 4,104,222 A | * 8/1978 | Date et al. | |
| 4,107,256 A | * 8/1978 | Conrad et al. ................ 528/65 |
| 4,113,676 A | * 9/1978 | Niederst ..................... 524/195 |
| 4,120,841 A | * 10/1978 | Takahashi et al. | |
| 4,130,528 A | 12/1978 | Chen | |
| 4,143,015 A | * 3/1979 | Soeterik ..................... 524/247 |
| 4,156,702 A | * 5/1979 | Edinger ...................... 524/151 |
| 4,159,363 A | * 6/1979 | Elmer et al. ................. 428/295 |
| 4,250,070 A | 2/1981 | Ley et al. | |
| 4,342,843 A | 8/1982 | Perlinski et al. | |
| 4,463,110 A | 7/1984 | Perlinski et al. | |
| 4,485,200 A | 11/1984 | Perlinski et al. | |
| 4,624,679 A | 11/1986 | McEntee ....................... 8/650 |
| 4,663,077 A | 5/1987 | Rei et al. .................... 252/364 |
| 4,666,706 A | 5/1987 | Farquharson et al. ....... 424/408 |
| 4,666,956 A | 5/1987 | Spielau et al. .............. 523/122 |
| 4,686,239 A | 8/1987 | Rei ............................. 521/55 |
| 4,735,981 A | * 4/1988 | Rich et al. | |
| 4,747,902 A | 5/1988 | Saitoh ..................... 156/244.11 |
| 4,789,692 A | 12/1988 | Rei et al. .................... 523/122 |
| 4,820,863 A | 4/1989 | Taylor | |
| 4,855,001 A | 8/1989 | Damico et al. | |
| 4,876,070 A | 10/1989 | Tsukahara et al. .......... 422/122 |
| 4,888,175 A | 12/1989 | Burton, Jr. et al. ......... 424/409 |
| 4,891,391 A | 1/1990 | McEntee .................... 523/122 |
| 4,931,494 A | 6/1990 | Auchter et al. | |
| 4,952,621 A | * 8/1990 | Bandlish .................... 524/195 |
| 4,990,232 A | * 2/1991 | Alder ......................... 564/252 |
| 5,008,363 A | 4/1991 | Mallon et al. | |
| 5,023,097 A | 6/1991 | Tyson ........................ 426/271 |
| 5,047,588 A | 9/1991 | Taylor | |

(List continued on next page.)

FOREIGN PATENT DOCUMENTS

| | | | |
|---|---|---|---|
| CA | 2121959 | 10/1994 | |
| CS | 261085 | 1/1989 | |
| DE | 1 917 236 | 11/1970 | |
| DE | 39 17 306 | 12/1990 | |
| DE | 39 33 204 | 4/1991 | |
| DE | 197 27 029 | 1/1999 | |
| EP | 0144726 | 5/1989 | ............. 25/2 |
| EP | 0 451 998 | 10/1991 | |
| EP | 0 936 249 A1 | 8/1999 | |
| GB | 1169288 | 11/1969 | |
| GB | 2 124 239 | 2/1984 | |
| JP | 50-3444 | 1/1975 | |
| JP | 50-3446 | 1/1975 | |
| JP | 50-22044 | 3/1975 | |
| JP | 58-21470 | 2/1983 | |
| JP | 6-36543 | 2/1985 | |
| JP | 60-255875 | 12/1985 | |
| JP | 61-283541 | 12/1986 | |
| JP | 1-129083 | 5/1989 | |
| JP | 2-20585 | 1/1990 | |
| JP | 2-127491 | 5/1990 | |
| JP | 4-164986 | 6/1992 | |
| JP | 4-323292 | 11/1992 | |
| JP | 8-199149 | 8/1996 | |
| JP | 3-302315 | 11/1996 | |
| JP | 10-195406 | 7/1998 | |
| JP | 10-273587 | 10/1998 | |
| JP | 11130913 | 5/1999 | |
| JP | 11-151794 | 6/1999 | |
| SK | 278 615 | 11/1997 | |
| SU | 480259 | 6/1978 | |
| SU | 852907 | 8/1981 | |
| WO | WO 92/02568 | 2/1992 | |
| WO | WO 94/13703 | 6/1994 | |
| WO | WO 95/19403 | 7/1995 | |
| WO | WO 97/19121 | 5/1997 | |
| WO | WO 97/32805 | 9/1997 | |

(List continued on next page.)

OTHER PUBLICATIONS

The Condensed Chemical Dictionary, tenth edition, ed. Gesssner G. Hawley, pp. 176,261,590 and 726, 1981.*

Karagezyan et al., Kozh–Obuvn. Prom–st. (1997) (2), pp. 35–36 (Eng. Abs).

(List continued on next page.)

*Primary Examiner*—Peter Szekely
(74) *Attorney, Agent, or Firm*—Scott A. Bardell

(57) ABSTRACT

The invention provides stabilizer systems for scavenging acid, minimizing hydrolysis, or both in polymer systems. The invention comprises a combination selected from the group consisting of: branched primary amino alcohol and carbodiimide; branched primary amino alcohol and dihydroxy metal compound; carbodiimide and dihydroxy metal compound; carbodiimide, branched primary amino alcohol, and magnesium oxide; branched primary amino alcohol and magnesium oxide; carbodiimide and magnesium oxide; and a combination of branched primary amino alcohol, carbodiimide, and dihydroxy metal compound.

10 Claims, No Drawings

U.S. PATENT DOCUMENTS

| | | | |
|---|---|---|---|
| 5,051,474 A | 9/1991 | Warren et al. | |
| 5,063,706 A | 11/1991 | Aki et al. | 43/125 |
| 5,081,173 A | 1/1992 | Taylor | |
| 5,108,653 A | 4/1992 | Taylor | |
| 5,176,777 A | 1/1993 | Guilhem | |
| 5,194,458 A * | 3/1993 | Tarquini | 524/424 |
| 5,276,096 A * | 1/1994 | Serdiuk et al. | 524/195 |
| 5,539,043 A * | 7/1996 | Kimura et al. | |
| 5,543,455 A | 8/1996 | Shah | |
| 5,554,373 A | 9/1996 | Seabrook et al. | 424/400 |
| 5,574,083 A * | 11/1996 | Brown et al. | 524/186 |
| 5,585,192 A * | 12/1996 | Sharma et al. | |
| 5,608,000 A | 3/1997 | Duan et al. | |
| 5,610,232 A | 3/1997 | Duan et al. | |
| 5,624,758 A | 4/1997 | Maksymkiw et al. | |
| 5,652,288 A | 7/1997 | Wood et al. | |
| 5,652,299 A | 7/1997 | Nakajima et al. | |
| 5,703,158 A | 12/1997 | Duan et al. | |
| 5,717,025 A | 2/1998 | Maksymkiw et al. | |
| 5,721,302 A | 2/1998 | Wood et al. | |
| 5,739,201 A | 4/1998 | Ugai et al. | |
| 5,777,029 A | 7/1998 | Horrion et al. | |
| 5,804,672 A | 9/1998 | Bolte et al. | |
| 5,821,294 A | 10/1998 | Perlinski | |
| 5,821,297 A | 10/1998 | Arnold et al. | |
| 5,834,542 A * | 11/1998 | Bayer et al. | |
| 5,837,089 A | 11/1998 | Magrum | |
| 5,840,823 A | 11/1998 | Licht et al. | |
| 5,856,014 A * | 1/1999 | Imashiro et al. | |
| 5,872,182 A | 2/1999 | Duan et al. | |
| 5,905,113 A | 5/1999 | Licht et al. | |
| 5,916,960 A | 6/1999 | Lum et al. | |
| 5,985,980 A * | 11/1999 | Harui et al. | |
| 6,184,410 B1 * | 2/2001 | Bollmann et al. | 528/272 |
| 6,248,819 B1 * | 6/2001 | Masuda et al. | |

FOREIGN PATENT DOCUMENTS

| | | |
|---|---|---|
| WO | WO 98/33602 | 8/1998 |
| WO | WO 99/14278 | 3/1999 |
| WO | WO 99/14279 | 3/1999 |
| WO | WO 99/26993 | 6/1999 |
| WO | WO 99/48997 | 9/1999 |

OTHER PUBLICATIONS

Ogandzhanyan et al., Arm. Khim. Zh. (1977), 30(6), pp. 458–464 (Eng. Abs.).

Ordukhanyan et al., Arm. Khim. Zh. (1988), 41(3), pp. 142–146 (Eng. Abs.).

Boshnyakova et al., Plast. Massy (1976), (8), pp. 41–42 (Eng. Abs.).

Oganesyan et al, Prom. Sin. Kauch. Nauch.–Tekh. Sb (1969), No. 7, pp. 9–12 (Eng. Abs. Only).

Karapetyan et al, Prom. Sin. Kauch., Nauch.–Tekh. Sb (1969), No. 4, pp. 12–14 (Eng. Abs. Only).

Kleps et al., "Investigation of the Influence of Metal Oxides on the Thermal Degradation of Chlorine–Containing Polymers by Thermogravimetry," *Journal of Thermal Analysis*, vol. 32 (1987), pp. 1785–1789.

Kleps, et al., "Investigation of the Influence of Zinc Oxide on Thermal Degradation of Olychloroprene," *Journal of Thermal Analysis*, vol. 36 (1990), pp. 1213–1221.

Abdek–Razik, "Photostabilizing Effect of 5–Hydroxy–3–Phenyl–amino–1–Phenyl–3:5–Dihydrobenzene Derivatives in Polychloroprene," *Journal of Polymer Science: Part A: Polymer Chemistry*, vol. 26, pp. 2359–2367 (1988).

Musch et al., "Polychloroprene Crosslinking for Improved Aging Resistance," KGK Kautschuk Gummi Kunstoffe 49, Jahngang, Nr. 5/96.

Al–Mehdawe et al., "Rubber–Bound Antioxidants. I. Amine Antioxidants Bound to Polychloroprene Rubber," *Rubber Chemistry and Technology*, vol. 62, pp. 13–32.

Al–Mehdawe et al., "Rubber Bound Antioxidants. II. Amine Antioxidants Bound with Polychloroprene Rubber," *J. Patrol. Res.*, vol. 7, No. 2 (1988), pp. 99–110.

Amano et al., "Studies on the Stabilization of Chloroprene Rubbers Part I Thermal Dehydrochlorination Studies by the pH Method," UDC, 678, 763:66, 081, pp. 45–50.

Gardner et al., "The Thermal Degradation of Polychloroprene–I / Thermal Analysis Studies of the Stability of Polychloroprene Samples, and Measurements of the Kinetics of Degradation," *European Polymer Journal*, 1971, vol. 7, pp. 569–591.

Johasz et al., "Thermal study of chlorine–containing polymers. I. Direct determination of the 1,2–units of polychloroprenes by thermal dehydrochlorination," Muanyag es Gumi (1968), 5(10), pp. 381–385 (Eng. Abs.).

Technical Data Sheet: "Primary Amino Alcohols", TDS 10, (1998), ANGUS Chemical Company, Buffalo Grove Il.

Technical Data Sheet: "AquaStik™ 1120", (1/97) 248348A, DuPont Dow Elastomers, Wilmington, DE.

Technical Data Sheet: "AquaStik™ Selection Guide", (7/96) 248347A, DuPont Dow Elastomers, Wilmington DE.

Technical Data Sheet: "AquaStik™ 2540", DuPont Dow Elastomers, Wilmington, DE.

"What is AQR–0033?" (Aug. 14, 1998), DuPont Dow Elastomers, Wilmington, DE (pp. 4–12).

Technical Information: "Adhesive Raw Materials—Acronal® A 310 S", (1996) BASF Corporation, Charlotte, NC.

Technical Data Sheets: BASF Introduces: Luphen Polyester Urethane D DS 3507 For Technical Dry Bonding Applications, Luphen D DS 3507, BASF Charlotte Technical Center, Charlotte, NC, Presented Feb. 1999.

Technical Brochure: "Dispercoll for the manufacture of adhesives", Bayer, pp. 1–17.

Technical Data Sheets: "DRT—resin dispersions for water–based adhesives", Les Dérivés Résiniques & Terpéniques S.A.

Technical Data Sheet: "Dermulsene DT 50" (May 10, 1998), Les Dérivés Résiniques & Terpéniques S.A.

Technical Data Sheets: Dermulsene® in water based contact adhesives for "foam bonding" applications, (Apr. 1999), Les Dérivés Résiniques & Terpéniques S.A.

Technical Data Sheets: "Hercules Chemical Specialties Product Data, Piccotex® LC–55WK Anionic, Pure Monomer Resin Dispersion", (Jul. 24, 1996), Hercules Incorporation, Wilmington, DE.

Technical Brochure: Tacolyn 5001 Resin Dispersion (Res A–2496), Hercules Chemical Specialties.

Technical Data Sheet: "Polyurethane Dispersions, Quilastic", Issue 05, (01/99), Merquinsa, Barcelona, Spain.

Technical Data Sheet: "Quilastic DEP–170 Provisional Data Sheet", Issue 03, (01/99), Merquinsa, Barcelona, Spain.

Technical Data Sheet: Quilastic DEP–172 Provisional Data Sheet, Issue 04, (01/99), Merquinsa, Barcelona, Spain.

Technical Brochure: Neoprene polychloroprene, "Basic Compounding of Neoprene Latex", NL–310.1, ADH–220.2, (9/96) 300609A, DuPont Dow Elastomers, Wilmington, DE.

Technical Brochure: "Urethane Additives Package", Rhein Chemie Corporation.

Technical Data Sheet: "HRJ–12573", UTO1750 (6/99), Schenectady International Inc., Schenectady, NY.

Technical Data Sheet: HRJ–13130, UMO1630RI (2/95), Schenectady International Inc., Schenectady, NY.

Technical Data Sheet: "Durite AL 3029C", TDS AL, 3029C, (02/99), Borden Chemical—Canada.

Technical Data Sheet: "Durite AL 8405C", TDS AL, 8405C, (10/93), Borden Chemical—Canada.

* cited by examiner

WATER-DISPERSED POLYMER STABILIZER

FIELD OF THE INVENTION

This invention relates to stabilizers for water-dispersed polymers, and more particularly to stabilizers for water-dispersed polymers that have a propensity to release acids and/or have groups that hydrolyze over time such as polychloroprenes and polyester urethanes.

BACKGROUND OF THE INVENTION

Water dispersed polymers and polymer systems are widely available and are used, for example, as coatings and adhesives. Many of the known water-dispersed adhesive compositions contain polychloroprene. It is known that polychloroprenes and other similar halogenated compounds are not stable over time. Such compounds have a propensity to release acids over time in the form of halogens such as chlorides. This acid release lowers the pH of the system which can destabilize the polymer dispersion, detrimentally affect open time of an adhesive, and accelerate thermal degradation of the aqueous composition and the resulting waterless solid.

To solve the above problems, zinc oxide or a combination of zinc oxide and magnesium oxide have been used in compositions containing polychloroprene. These compounds are reported to function as acid scavengers and or crosslinkers. However, the use of these compounds in compositions containing polychloroprene has produced less than satisfactory results. For example, zinc oxide cannot be used with carboxylated polychloroprene dispersions because zinc ion will react with the organic acid groups and cause the polychloroprene dispersion to coagulate prematurely. It has also been reported that the presence of zinc oxide decreases the thermal stability of polychloroprene by lowering the temperature required for the polychloroprene to release labile chlorine. Additionally, compounds such as polyester urethanes may be prone to reaction with zinc oxide and are susceptible to acid induced hydrolysis of the polyester group if the free acid is not adequately scavenged. Thus, in some instances, the use of zinc oxide as an acid scavenger may limit the types of polymers which may be used in combination with polychloroprene. The addition of magnesium oxide to the above water dispersions containing zinc oxide does not solve the problem of premature coagulation of the dispersed polymers.

SUMMARY OF THE INVENTION

In one aspect, the invention provides a stabilizer system for polymers susceptible to hydrolysis and/or acid release comprising a combination selected from the group consisting of: branched primary amino alcohol and carbodiimide; branched primary amino alcohol and dihydroxy metal compound; carbodiimide and dihydroxy metal compound; carbodiimide, branched primary amino alcohol, and magnesium oxide; branched primary amino alcohol and magnesium oxide; carbodiimide and magnesium oxide; and a combination of branched primary amino alcohol, carbodiimide, and dihydroxy metal compound.

The stabilizing systems of the invention are free from zinc oxide, that is, do not contain zinc oxide. The stabilizing systems of the invention also do not contain aziridines and can also be used in dispersed polymers or solventless polymers without the need for external plasticizers. The term "plasticizer", as used herein, means compounds from the following classes: phthalates including alkyl benzyl phthalates; adipates including dialkyl adipates; phosphates including alkyl aryl phosphates and triaryl phosphates; alkyl and aryl sulfonamides; and hydrogenated terphenyls.

The term "acid scavenger" means acid acceptor or acid neutralizer.

The term "dispersion" encompasses any form of solid dispersed in a liquid medium including, for example, latexes, emulsions, colloidal suspensions, and the like.

The stabilizer systems of the invention can be used in aqueous polymer dispersions and the resulting polymer after water has been removed to minimize a decrease in pH over time and/or minimize the hydrolysis of susceptible groups, for example, ester groups.

DETAILED DESCRIPTION OF THE PREFERRED EMBODIMENTS

The stabilizer systems of the invention are useful for stabilizing polymers or polymer systems which contain ester groups or ester functionality or release acids upon aging. The polymers or polymer systems may be in the form of a water dispersion or may be the resulting solidified or dried adhesive after the water has been removed. Depending upon the mixture of components, the stabilizer systems of the invention protect the ester groups from hydrolysis and/or scavenge or neutralize free acid without the use of zinc oxide or plasticizers. The stabilizer systems of the invention comprise combinations of two or more components that may be used in polymers or polymer systems in an effective amount to minimize hydrolysis and/or free acid. As used herein, an "effective amount" means a sufficient amount of a stabilizer system so to prevent either coagulation of the base polymer or hydrolysis of any ester moieties of the base polymer. A "base polymer" is a polymer or combination of polymers that either coagulate or have ester moieties that hydrolyze, or both, in the presence of acid.

The stabilizer systems of the invention are typically useful in water-dispersed polymers or water-dispersed polymer systems containing halogenated species and/or ionic functionality, for example, carboxylation and/or sulfonation. The term "water dispersed" means that the carrier is primarily water. However, incidental organic solvents, such as those present in additives and commercially available components, may be present. Preferably, however, "water-dispersed" refers to a 100% water carrier. Examples of water-dispersed polymers that may require stabilization from hydrolysis or acid release include acrylics, acrylates, polyesters, polyurethanes, rosin esters, polychloroprenes, chlorinated polyolefins, polyvinyl chlorides, and combinations thereof. The stabilizer systems are also useful in the resulting adhesives that are formed from removing water from the above described polymers and polymer systems.

The stabilizer systems of the invention are generally used in compositions containing water-dispersed polymers which require stabilization in an effective amount. An "effective amount" of a stabilizer system means an amount of stabilizer system so to prevent either coagulation of the polymer composition or hydrolysis of any ester moieties of the polymers or other resins containing ester moieties. Hydrolysis of ester moieties of the susceptible polymer will cause the adhesive performance of the adhesive prepared therefrom to decline. Such hydrolysis may be detected by a major shift in pH of the polymer system, for example, an adhesive composition, and by using analytical techniques such as Fourier Transform Infrared Spectroscopy (FTIR), Gas Chromatography (GC), and mass spectrometry.

The stabilizer systems of the invention may comprise one or more branched primary amino alcohols. The branched primary amino alcohols act primarily as an acid scavenger. The branched primary amino alcohols are derived from nitroparaffins by way of nitro alcohols. Useful branched primary amino alcohols are those which are miscible in water. Preferred primary amine alcohols include 2-amino-1-butanol; 2-amino-2-methyl-1,3-propanediol; 2-amino-2-methyl-1-propanol; 2-amino-2-ethyl-1,3-propanediol; and tris(hydroxymethyl)aminomethane.

The stabilizer systems of the invention may comprise one or more carbodiimides. A carbodiimide, as used herein, is a compound containing the functional group: —N=C=N—. The carbodiimides are useful for preventing hydrolysis of functional groups such as ester groups. The carbodiimides may be aliphatic or aromatic. Useful carbodiimides are either miscible or dispersible in water. Preferred carbodiimides are those that are sterically hindered, water miscible, and contain little or no organic solvent. Preferred commercially available carbodiimides include Stabaxol® P 200 (reaction product of tetramethylxylene diisocyanate; water-dispersed), Stabaxol® P (poly(nitrilomethanetetraylnitrilo (2,4,6-tris(1-methylethyl)-1,3-phenylene)), and Stabaxol® I (tetraisopropyldiphenylcarbodiimide) (RheinChemie) and Ucarlnk® XL-29SE (Union Carbide). Both Stabaxol® P and I are useful in the compositions of the invention if first dispersed in water.

The stabilizer systems of the invention may contain one or more dihydroxy metal compounds. The dihydroxy metal compounds are useful as acid scavengers. Useful dihydroxy metal compounds are those compounds having fully substituted trivalent metal ion wherein two of the valences are filled with hydroxyl groups and the third valence is filled with a moiety other than hydroxyl. Useful dihydroxy metal compounds are dispersible in water. Preferred dihydroxy metal compounds include dihydroxyaluminum aminoacetate and dihydroxyaluminum sodium carbonate.

The stabilizer systems of the invention may also contain magnesium oxide. Preferably, the magnesium oxide is in the form of a water dispersion. It should be understood, however, that a certain amount of magnesium oxide converts to magnesium hydroxide in the presence of water. Preferred "magnesium oxide" dispersions are made from commercially available magnesium oxide such as Elastomag™ 170 (Morton Thiokol) and Maglite™ A (C. P. Hall). Magnesium oxides may be dispersed by those skilled in the art or obtained from vendors such as Harwick Chemical, Tiarco Chemical, and H. M. Royal.

In general, branched primary amino alcohol may be used in a water-dispersed polymer or polymer system in an amount of from about 0.5 to about 5 parts per 100 parts dominant polymer by dry weight, hereinafter "phr." As used herein, "dominant polymer" means the one polymer present in the highest concentration (on a dry basis) which requires stabilization, for example, that releases acid and/or has groups susceptible to hydrolysis over time. Preferably, the branched primary amino alcohol may be present in an amount of from about 2 to about 4 phr, more preferably from about 2.5 to about 3.5 phr. On a basis of parts by weight per 100 parts total dry solids by weight of a polymer system, the above ranges are about 0.5 to about 3 and about 1 to about 2.7, respectively.

Carbodiimide may be present in a water-dispersed polymer or polymer system in an amount of from about 0.5 to about 5 phr, preferably from about 2 to about 4 phr, more preferably from about 2.5 to about 3.5 phr. On a basis of parts by weight per 100 parts total dry solids by weight of a polymer system, the above ranges are about 0.25 to about 4, about 0.5 to 3.5, and about 1 to about 2.7, respectively.

Dihydroxy metal compound (as defined above) may be present in a water dispersed polymer or polymer system in an amount of from about 0.5 to about 5 phr, preferably from about 2 to about 4 phr, more preferably from about 2.5 to about 3.5 phr. On a basis of parts by weight per 100 parts total dry solids by weight of a polymer system, the above ranges are about 0.25 to about 3, about 0.5 to about 2, and about 0.8 to about 1.5, respectively.

Magnesium oxide may be present in a water dispersed polymer or polymer system in an amount of from about 0.5 to about 5 phr, preferably about 2.5 to about 3.5 phr. On a basis of parts by weight per 100 parts total dry solids by weight of a polymer system, the above ranges are about 0.25 to about 2 and about 0.5 to about 1.5, respectively.

Preferably, the above individual components are used in various combinations in a polymer or polymer system. Specific combinations of components are: a combination of branched primary amino alcohol and carbodiimide; a combination of branched primary amino alcohol and dihydroxy metal compound; a combination of carbodiimide and dihydroxy metal compound; a combination of branched primary amino alcohol, carbodiimide, and magnesium oxide; a combination of branched primary amino alcohol and magnesium oxide; a combination of carbodiimide and magnesium oxide; and a combination of branched primary amino alcohol, carbodiimide, and dihydroxy metal compound. Generally, the ratio of branched primary amino alcohol to carbodiimide ranges from about 0.5:1 to 1:0.5 by weight with a ratio of about 1:1 being preferred. A preferred ratio of branched primary amino alcohol to dihydroxy metal compound is about 1:1 by weight. A preferred combination containing magnesium oxide is the combination of branched primary amino alcohol, carbodiimide, and magnesium oxide in about 1:1:1 ratio by weight.

Combinations containing branched primary amino alcohol and dihydroxy metal compounds are preferred for acid scavenging applications. Combinations containing carbodiimide are preferred for hydrolysis prevention applications.

The stabilizer systems of the invention may optionally, but preferably, contain one or more antioxidants. Useful antioxidants include Octolite™ 640, a 55% solids by weight emulsion blend 50:50 by weight of a polymeric hindered phenol and a thioester; Octolite™ 561, a 50% solids by weight dispersion of 4,4'-butylidenebis(6-t-butyl-m-cresol); Octolite™ 544, a 55% solids by weight dispersion of N,N'-di-beta-napthyl-p-phenylenediamine; Octolite™ 504, a 50% solids by weight dispersion of 2,2'-methylenebis(6-t-butyl-p-cresol); Octolite™ 485 (a 46% solids by weight dispersion of Bisphenol antioxidant, an anionic emulsion of Uniroyal's Naugawhite Liquid); Octolite™ 424, a 63% solids by weight emulsion blend 50:50 by weight of a polymeric hindered phenol and di-tridecylthiodipropionate (DTDTDP) thioester; Octolite™ AO-50, a 50% solids by weight emulsion of a hindered phenol and DTDTDP thioester; Octolite™ AO-28, a 63% solids by weight emulsion blend 80:20 of a polymeric hindered phenol and DTDTDP thioether; and Octolite™ WL, a 50% solids by weight emulsion of butylated reaction product of para-cresol and dicyclopentadiene, all available from Tiarco Chemical Division, Textile Rubber and Chemical Company, Inc., Dalton, Ga.

The stabilizer systems of the invention may be combined with polymers or polymeric systems as neat compounds or as water dispersions with mixing at room temperature. The components of the stabilizer system are typically added individually. Typically, the antioxidant(s), if present, is/are added first, followed by acid scavenger(s), followed by anti-hydrolysis agent(s), if used.

The stabilizer systems of the invention may be used to stabilize polymers or polymers systems containing, for example, polymers susceptible to hydrolysis and polymers that release groups that form acids. The specific combinations of the various individual components of the stabilizer system depends upon the type and characteristics of the polymers in the system. For example, in polymers or polymers systems that are susceptible to hydrolysis of ester groups and contain no acid generating polymers, such as carboxylated polyester polyurethanes, or sulfonated polyester polyurethanes, a combination of at least two of branched primary amino alcohol, dihydroxy metal compound, and carbodiimide would be used in an effective amount. Magnesium oxide would not be used in combination with other stabilizer components in polymers or polymer systems containing carboxylated polyester polyurethanes.

For compositions containing primarily acid generating polymers, for example, chlorine containing polymers, or combinations of acid generating polymers and sulfonated polyester polyurethanes, a combination of at least two of branched primary amino alcohol, carbodiimide, dihydroxy metal compound, and magnesium oxide, would be used in an effective amount with the exception of stabilizer systems containing both dihydroxy metal compound and magnesium oxide. In this case, the stabilizer system would also be used in an effective amount as defined in this application.

Index of Abbreviations

| Abbreviation | Tradename | Description |
|---|---|---|
| Polychloroprene | | |
| AQS1120 | AquaStik ™ 1120 | Polyvinyl alcohol stabilized, methacrylic acid containing polychloroprene latex dispersion, 47% solids by weight, available from DuPont Dow Elastomers Llc, Wilmington, DE |
| AQS2540 | AquaStik ™ 2540 | Carboxylated polychloroprene copolymer latex dispersion, medium gel, medium crystallinity, 59% solids by weight, available from DuPont Dow Elastomers Llc. |
| L735A | Latex 735A | Carboxylated polychloroprene latex dispersion, sol gel, medium crystallinity, 45% solids by weight, available from DuPont Dow Elastomers Llc. |
| AQS0033 | AquaStik ™ AQ0033 | Carboxylated polychloroprene homopolymer latex dispersion, low gel, medium crystallinity, 46% solids by weight, available from DuPont Dow Elastomers Llc. |
| C84 | Dispercoll ™ C84 | Polychloroprene latex dispersion, 55% solids by weight, high crystallinity, low gel, available from Bayer Corporation, Pittsburgh, PA |
| C74 | Dispercoll ™ C74 | Polychloroprene latex dispersion, 59% solids by weight, medium crystallinity, high gel, available from Bayer Corporation |
| Polyester Polyurethane | | |
| DDS3507 | Luphen ™ DDS 3507 | Sulfonated polyester polyurethane dispersion, 40% solids by weight, measured storage modulus (G') = 9 × $10^8$ @ 25° C.; ~1 × $10^7$ @ 55° C.; 9 × $10^6$ @ 100° C., available from BASF Corporation, Toronto, Ontario, Canada |
| U53 | Dispercoll ™ U-53 | Sulfonated polyester polyurethane dispersion, 40% solids by weight, measured storage modulus (G') = 1 × $10^9$ @ 25° C.; ~2 × $10^7$ @ 55° C.; ~1 – 2 × $10^7$ @ 100° C., available from Bayer Corporation, Pittsburgh, PA |
| U54 | Dispercoll ™ U-54 | Polyurethane dispersion, 50% solids by weight, measured storage modulus (G') = 1 × $10^9$ @ 25° C.; ~2 × $10^7$ @ 55° C.; 5 × $10^6$ @ 100° C., available from Bayer Corporation |
| DEP172 | Quilastic ™ DEP 172 | Carboxylated polyester polyurethane dispersion, measured storage modulus (G') = 1 × $10^9$ @ 25° C.; ~2 × $10^6$ @ 55° C.; ~6 × $10^5$ @ 100° C., available from Merquinsa Corporation, Barcelona, Spain |
| DEP170 | Quilastic ™ DEP 170 | Carboxylated polyester polyurethane dispersion, measured storage modulus (G') = 1 × $10^9$ @ 25° C.; ~1 × $10^6$ @ 55° C.; ~2 × $10^5$ @ 100° C., available from Merquinsa Corporation |

-continued

| Abbreviation | Tradename | Description |
|---|---|---|
| Acrylic Ester Copolymer | | |
| A310S | Acronal ™ A 310S | Butyl Acrylate/Methylmethacrylate copolymer dispersion with hydrazide functionality, 55% solids by weight, Tg: −20° C., available from BASF Corporation |
| Stabilizer | | |
| P200 | Stabaxol ™ P 200 | Water-dispersible hindered aromatic carbodiimide (reaction product of tetramethylxylene diisocyanate), available from RheinChemie, Trenton, NJ |
| Trisamino | Tris(hydroxymethyl) aminomethane | Neat, available from Angus Chemical Company, Buffalo Grove, IL |
| TrisaminoK | Tris(hydroxymethyl) aminomethane/Potassium dihydrogen phosphate (2.65:1) | Prepared by combining each neat material to make a 29% solids by weight solution. Potassium dihydrogen phosphate, available from Aldrich Chemical, Milwaukee, WI |
| DHAA | Dihydroxyaluminum aminoacetate | Neat, available from Chattem Chemicals, Chattanooga, TN |
| MgO | Maglite ™ A | Magnesium oxide dispersion, 50% solids by weight, available from Tiarco Chemical Division of Textile Rubber and Chemical Company, Dalton, GA |
| Miscellaneous Additives | | |
| Ol 640 | Octolite ™ 640 | Antioxidant which is an emulsion blend of 50:50 by weight polymeric hindered phenol and thioester, 50% solids, available from Tiarco Chemical Division, Dalton, GA |
| Ol 504 | Octolite ™ 504 | Antioxidant which is a 50% solids by weight dispersion of 2,2'-methylenebis(6-t-butyl-p-cresol), available from Tiarco Chemical Division |
| Ol 424 | Octolite ™ 424 | Antioxidant which is a 63% solids by weight emulsion blend 50:50 by weight of a polymeric hindered phenol and di-tridecylthiodipropionate (DTDTDP) thioester, available from Tiarco Chemical Division |
| ZnO | | Zinc oxide dispersion, 60% solids by weight, available from R. T. Vanderbilt, Norwalk, CT |
| T-IV | Alkaterge ™ T-IV | Multi-functional oxazoline, 100%, available from Angus Chemical Company, Buffalo Grove, IL |
| A494 | Aquamix ™ 494 | Antioxidant which is a 63% by weight solids emulsion blend of Wingstay ™ L and a thioester synergist, available from Harwick Chemical, a Business unit of M. A. Hanna Company, Cuyahoga Falls, OH |
| HSC | Halogard ™ SC | Neat, available from Chattem Chemicals |
| DT50 | Dermulsene ™ DT50 | Terpene-phenolic thermoplastic resin, 50 S.P., available from DRT, Dax, France |

EXAMPLES

The invention will be further illustrated by the following examples, which are illustrative of specific modes of practicing the invention, and are not intended as limiting the scope of the appended claims.

Parts per hundred (phr), unless otherwise stated, are parts per 100 parts of the dry weight of the component in each column of each Table that is present in an amount of 100 parts.

Blanks in the Tables indicate that no value was noted or that an ingredient was not present.

Unless otherwise stated, all components were added in the form of dispersions (i.e., in water).

Test Procedures

Elevated Temperature Stability

This test is intended to give an indication of long-term stability at room temperature of a particular composition by subjecting it to elevated temperature.

A composition of the invention is prepared, sealed in a 60 mL polyethylene bottle that was half filled, and placed in an air-circulating oven at 122° F. (50° C.). After various time intervals (as indicated), the composition is removed from the oven, conditioned at room temperature for 3 to 4 hours, and tested for pH using an Orion Model 710A pH meter, available from Orion Research Inc., Beverly, Mass.

In addition, the composition is inspected using a metal spatula to see the extent the composition has coagulated, congealed, curdled, separated, settled, or formed non-easily mixable or non-easily dispersible layers. The terms "solid" and "coagulated" means that the composition has formed a solidified mass that is no longer flowable. The term "semi-solid" means the composition has formed a highly viscous, soft paste. "Grainy" means that the formulation has formed into discreet large particles. A measurement of "sediment" means the volume of settled solid material that has precipitated out of the dispersion. It is preferred that the composition has no coagulation, graininess, of semi-solid formation for at least 4 weeks at 50° C.

Comparative Examples C-1–C-20

These Comparative Examples were prepared to compare the effectiveness of a polycarbodiimide (P200) and a multifunctional oxazoline (T-IV) in stabilizing compositions containing blends of polychloroprenes and polychloroprenes, polyester polyurethane, and an acrylic ester copolymer. Compositions containing only polychloroprenes as the polymer base resin were made by blending the polychloroprenes together and then blending the comparative example stabilizer system using agitation. The remaining compositions were made by mixing in order: polychloroprenes, acrylic ester copolymer, polyester polyurethane, and stabilizer system. Comparative Example controls contained no stabilizer system. The compositions are shown in Table 1 and the corresponding pH aging data is shown in Table 2. The data show that oxazoline (T-IV) accelerated a decline in pH relative to the controls. Polycarbodiimide (P200) alone, in higher levels, limited pH drift. However, polycarbodiimide alone may not provide adequate pH stability because carbodiimides are most efficient in neutralizing organic acids into urea structures.

TABLE 1

| Component | C-1 | C-2 | C-3 | C-4 | C-5 | C-6 | C-7 | C-8 |
|---|---|---|---|---|---|---|---|---|
| AQS0033 (phr) | | | | | | | | |
| C74 | 100 | 100 | 100 | 100 | 100 | 100 | 100 | 100 |
| AQSA2540 (phr) | | | | | | | | |
| C84 | 100 | 100 | 100 | 100 | 100 | 100 | 100 | 100 |
| U54 (phr) | | 50 | | 50 | | 50 | | 50 |
| A310S (phr) | | 75 | | 75 | | 75 | | 75 |
| T-IV (phr) | | | | | | | 2 | 3.25 |
| P200 (phr) | | | 2 | 3.25 | 4 | 6.5 | | |

| Component | C-9 | C-10 | C-11 | C-12 | C-13 | C-14 |
|---|---|---|---|---|---|---|
| AQS0033 | | | 100 | 100 | 100 | 100 |
| C74 | 100 | 100 | | | | |
| AQS2540 | | | 100 | 100 | 100 | 100 |
| C84 | 100 | 100 | | | | |
| U54 (phr) | | 50 | | 50 | | 50 |
| A310S (phr) | | 75 | | 125 | | 125 |
| T-IV (phr) | 4 | 6.5 | | | | |
| P200 (phr) | | | | | 2 | 3.75 |

| Component | C-15 | C-16 | C-17 | C-18 | C-19 | C-20 |
|---|---|---|---|---|---|---|
| AQS0033 | 100 | 100 | 100 | 100 | 100 | 100 |
| C74 | | | | | | |
| AQS2540 | 100 | 100 | 100 | 100 | 100 | 100 |
| C84 | | | | | | |
| U54 | | 50 | | 50 | | 50 |
| A310S | | 125 | | 125 | | 125 |
| T-IV (phr) | | | 2 | 3.75 | 4 | 7.5 |
| P200 | 4 | 7.5 | | | | |

TABLE 2

| pH | C-1 | C-2 | C-3 | C-4 | C-5 | C-6 | C-7 |
|---|---|---|---|---|---|---|---|
| Initial | 12.61 | 9.75 | 12.72 | 9.78 | 12.65 | 9.79 | 12.65 |
| 24 Hours | 12.53 | 9.73 | 12.67 | 9.75 | 12.59 | 9.80 | 12.52 |
| 72 Hours | 12.46 | 9.60 | 12.66 | 9.65 | 12.60 | 9.68 | 12.46 |
| 1 Week | 12.20 | 9.35 | 12.49 | 9.37 | 12.39 | 9.44 | 12.14 |
| 2 Weeks | 11.79 | 9.17 | 12.35 | 9.09 | 12.17 | 9.11 | 11.43 |
| 3 Weeks | 11.07 | 8.82 | 12.09 | 8.82 | 11.77 | 8.83 | 10.35 |
| 4 Weeks | 10.51 | 8.69 | 11.92 | 8.67 | 11.51 | 8.69 | 10.08 |
| 5 Weeks | 10.10 | 8.57 | 11.56 | 8.45 | 10.94 | 8.48 | 9.85 |
| 6 Weeks | 9.92 | 8.17 | 11.17 | 8.19 | 10.65 | 8.26 | 9.76 |
| 7 Weeks | 9.79 | 7.87 | 10.65 | 8.10 | 10.47 | 8.01 | 9.63 |
| 8 Weeks | 9.73 | 7.50 | 10.36 | 7.62 | 10.31 | 7.91 | 9.54 |
| 9 Weeks | 9.68 | 7.45 | 10.15 | 7.37 | 10.17 | 7.61 | 9.46 |
| 11 Weeks | 9.63 | 6.81 Coagulated | 9.86 | 7.19 | 9.99 | 7.40 | 9.38 |

| pH | C-8 | C-9 | C-10 | C-11 | C-12 | C-13 | C-14 |
|---|---|---|---|---|---|---|---|
| Initial | 9.78 | 12.66 | 9.80 | 12.57 | 9.05 | 12.57 | 9.04 |
| 24 Hours | 9.70 | 12.48 | 9.72 | 12.52 | 9.03 | 12.51 | 9.07 |
| 72 Hours | 9.60 | 12.38 | 9.60 | 12.50 | 9.05 | 12.52 | 8.98 |
| 1 Week | 9.33 | 11.94 | 9.42 | 12.32 | 8.76 | 12.37 | 8.74 |
| 2 Weeks | 9.03 | 10.70 | 9.17 | 12.09 | 8.52 | 12.24 | 8.49 |
| 3 Weeks | 8.78 | 9.95 | 8.79 | 11.62 | 8.24 | 11.87 | 8.18 |
| 4 Weeks | 8.62 | 9.86 | 8.67 | 10.86 | 8.08 | 11.50 | 8.02 |
| 5 Weeks | 8.40 | 9.66 | 8.57 | 10.11 | 7.82 | 10.74 | 7.78 |
| 6 Weeks | 8.27 | 9.59 | 8.27 | 9.48 | 7.66 | 10.24 | 7.60 |
| 7 Weeks | 7.94 | 9.48 | 8.08 | 9.21 | 7.38 | 9.80 | 7.38 |
| 8 Weeks | 7.86 | 9.42 | 7.90 | 8.87 | 7.19 | 9.45 | 7.21 |
| 9 Weeks | 7.47 | 9.35 | 7.76 | 8.73 | 6.99 | 9.26 | 7.03 |
| 11 Weeks | 7.03 | 9.24 | 7.32 Grainy | 8.69 | 6.61 | | 6.70 |

| pH | C-15 | C-16 | C-17 | C-18 | C-19 | C-20 |
|---|---|---|---|---|---|---|
| Initial | 12.58 | 9.08 | 12.57 | 9.06 | 12.58 | 9.06 |
| 24 Hours | 12.52 | 9.14 | 12.47 | 9.02 | 12.41 | 9.03 |
| 72 Hours | 12.54 | 9.00 | 12.45 | 8.95 | 12.37 | 8.98 |
| 1 Week | 12.39 | 8.75 | 12.23 | 8.77 | 12.07 | 8.82 |
| 2 Weeks | 12.26 | 8.47 | 11.97 | 8.58 | 11.64 | 8.63 |
| 3 Weeks | 11.94 | 8.14 | 11.32 | 8.32 | 10.54 | 8.39 |
| 4 Weeks | 11.70 | 8.01 | 10.55 | 8.18 | 10.12 | 8.30 |
| 5 Weeks | 11.01 | 7.78 | 10.02 | 7.98 | 9.74 | 8.12 |
| 6 Weeks | 10.47 | 7.63 | 9.73 | 7.83 | 9.51 | 8.00 |
| 7 Weeks | 10.13 | 7.46 | 9.44 | 7.62 | 9.29 | 7.81 |
| 8 Weeks | 9.83 | 7.33 | 9.16 | 7.46 | 9.13 | 7.68 |
| 9 Weeks | 9.53 | 7.21 | 8.90 | 7.28 | 8.96 | 7.52 |
| 11 Weeks | | 6.87 | 8.66 | 6.92 | 8.58 | 7.16 |

Comparative Examples C-21–C-27 and Example 1

These compositions were prepared to evaluate the impact of a combination of antioxidant with polycarbodiimide (P200) and the combination of antioxidant/polycarbodiimide (P200)/branched primary amino alcohol (Trisamino) on pH stability over time. The compositions were prepared by adding in order with agitation: AQS2540, L735A, A310S, U54, antioxidant, Trisamino, and P200. The compositions tested are shown in Table 3 and the resulting pH aging data are shown in Table 4. The data show that the addition of antioxidant (Ol 640, A494, Ol 504, Ol 424) to carbodiimide (P200) in the compositions slightly improved pH stability when compared to compositions containing polycarbodiimide (P200) alone. Example 1, further containing a branched primary amino alcohol (Trisamino), showed significantly improved pH stability when compared to Comparative Examples C-21–C-27.

TABLE 3

| Components | C-21 | C-22 | C-23 | C-24 | C-25 | C-26 | C-27 | Ex. 1 |
|---|---|---|---|---|---|---|---|---|
| L735A (phr) | 50 | 50 | 50 | 50 | 50 | 50 | 50 | 50 |
| AQS2540 | 100 | 100 | 100 | 100 | 100 | 100 | 100 | 100 |
| U54 (phr) | 37.5 | 37.5 | 37.5 | 37.5 | 37.5 | 37.5 | 37.5 | 37.5 |
| A310S (phr) | 93.75 | 93.75 | 93.75 | 93.75 | 93.75 | 93.75 | 93.75 | 93.75 |
| Ol 640 (phr) | | | 5.63 | 8.44 | | | | 5.63 |
| A494 (phr) | | | | | 5.63 | | | |
| Ol 504 (phr) | | | | | | 5.63 | | |
| Ol 424 (phr) | | | | | | | 5.63 | |
| Trisamino (phr) | | | | | | | | 4.22 |
| P200 (phr) | 4.22 | | 4.22 | 4.22 | 4.22 | 4.22 | 4.22 | 4.22 |

TABLE 4

| pH | C-21 | C-22 | C-23 | C-24 | C-25 | C-26 | C-27 | Ex. 1 |
|---|---|---|---|---|---|---|---|---|
| Initial | 8.88 | 8.85 | 8.83 | 8.85 | 8.74 | 8.84 | 8.84 | 9.29 |
| 24 Hours | 8.76 | 8.85 | 8.78 | 8.79 | 8.73 | 8.77 | 8.80 | 9.20 |
| 72 Hours | 8.73 | 8.70 | 8.75 | 8.74 | 8.72 | 8.76 | 8.78 | 9.26 |
| 1 Week | 8.50 | 8.65 | 8.56 | 8.56 | 8.54 | 8.56 | 8.59 | 9.14 |
| 2 Weeks | 8.15 | 8.25 | 8.32 | 8.30 | 8.34 | 8.34 | 8.36 | 9.07 |
| 3 Weeks | 7.86 | 7.97 | 8.12 | 8.11 | 8.17 | 8.17 | 8.14 | 8.97 |
| 4 Weeks | 7.60 | 7.66 | 7.92 | 7.91 | 7.98 | 7.98 | 7.97 | 8.87 |
| 5 Weeks | 7.37 | 7.38 | 7.76 | 7.73 | 7.81 | 7.81 | 7.89 | 8.76 |
| 6 Weeks | 7.19 | 7.20 | 7.59 | 7.60 | 7.70 | 7.70 | 7.67 | 8.68 |
| 8 Weeks | 6.83 | 6.99 | 7.37 | 7.35 | 7.45 | 7.44 | 7.42 | 8.53 |
| 9 Weeks | 6.71 | 6.67 | 7.27 | 7.28 | 7.36 | 7.39 | 7.36 | 8.56 |
| 10 Weeks | 6.63 | 6.37 | 7.17 | 7.16 | 7.25 | 7.26 | 7.23 | 8.47 |
| 11 Weeks | 6.40 | 6.29 | 7.02 | 7.01 | 7.08 | 7.11 | 7.09 | 8.27 |
| 12 Weeks | 6.29 | 6.07 | 6.93 | 6.93 | 7.00 | 7.03 | 7.00 | 8.39 |

TABLE 4-continued

| pH | C-21 | C-22 | C-23 | C-24 | C-25 | C-26 | C-27 | Ex. 1 |
|---|---|---|---|---|---|---|---|---|
| 14 Weeks | 6.01 | 5.84 | 6.69 | 6.68 | 6.74 | 6.79 | 6.75 | 8.17 |
| 15 Weeks | 5.97 | 5.58 | 6.56 | 6.55 | 6.60 | 6.67 | 6.62 | 8.10 |

Comparative Examples C-28–C-33 and Examples 2–3

These compositions were prepared to compare the performance of polycarbodiimide (P200) and branched primary amino alcohol (Trisamino) alone and combination on pH stability. The two control compositions (C-28 and C-29) contained no stabilizers. The compositions were prepared by mixing in order with agitation: AQS2540, L735A, A310S, U54, Trisamino, and P200. The compositions tested are shown in Table 5 and the resulting pH aging data are shown in Table 6. The data show that Examples 2 and 3 provided improved pH stability as compared to compositions containing only polycarbodiimide (P200) or only branched primary amino alcohol (Trisamino).

TABLE 5

| Components | C-28 | C-29 | C-30 | C-31 | C-32 | C-33 | Ex. 2 | Ex. 3 |
|---|---|---|---|---|---|---|---|---|
| L735A (phr) | 50 | 50 | 50 | 50 | 50 | 50 | 50 | 50 |
| AQS2540 | 100 | 100 | 100 | 100 | 100 | 100 | 100 | 100 |
| U54 (phr) |  | 37.5 |  | 37.5 |  | 37.5 |  | 37.5 |
| A310S (phr) |  | 93.75 |  | 93.75 |  | 93.75 |  | 93.75 |
| Trisamino (phr) |  |  | 2.25 | 4.22 |  |  | 2.25 | 4.22 |
| P200 (phr) |  |  |  |  | 2.25 | 4.22 | 2.25 | 4.22 |

TABLE 6

| pH | C-28 | C-29 | C-30 | C-31 | C-32 | C-33 | Ex. 2 | Ex. 3 |
|---|---|---|---|---|---|---|---|---|
| Initial | 12.46 | 8.85 | 12.35 | 9.33 | 12.40 | 8.88 | 12.37 | 9.36 |
| 24 Hours | 12.44 | 8.85 | 12.17 | 9.13 | 12.26 | 8.76 | 12.18 | 9.23 |
| 72 Hours | 12.33 | 8.70 | 12.24 | 9.12 | 12.17 | 8.73 | 12.24 | 9.23 |
| 1 Week | 12.33 | 8.65 | 12.13 | 8.98 | 12.04 | 8.50 | 12.14 | 9.08 |
| 2 Weeks | 12.00 | 8.25 | 11.96 | 8.87 | 11.78 | 8.15 | 12.06 | 8.96 |
| 3 Weeks | 11.63 | 7.97 | 11.76 | 8.74 | 11.06 | 7.86 | 11.95 | 8.87 |
| 4 Weeks | 10.85 | 7.66 | 11.31 | 8.52 | 10.51 | 7.60 | 11.66 | 8.65 |
| 5 Weeks | 10.03 | 7.38 | 10.76 | 8.46 | 10.19 | 7.37 | 11.40 | 8.64 |
| 6 Weeks | 9.74 | 7.20 | 10.40 | 8.32 | 9.73 | 7.19 | 11.11 | 8.48 |
| 8 Weeks | 9.21 | 6.99 | 9.89 | 8.11 | 9.56 | 6.83 | 10.67 | 8.26 |
| 9 Weeks | 8.99 | 6.67 | 9.78 | 8.12 | 9.39 | 6.71 | 10.55 | 8.35 |
| 10 Weeks | 8.77 | 6.37 | 9.61 | 7.97 | Solid | 6.63 | 10.40 | 8.22 |
| 11 weeks | 8.78 | 6.29 | 9.39 | 7.72 |  | 6.40 | 10.12 | 7.95 |
| 12 weeks | 8.73 | 6.07 | 9.39 | 7.76 |  | 6.29 | 10.08 | 8.15 |
| 14 weeks | Solid | 5.84 | 9.25 | Coag-ulated |  | 6.01 | 9.75 | 7.78 |
| 15 weeks |  | 5.58 | 9.23 |  |  | 5.97 |  | 7.81 |

Comparative Examples C-34–C-38 and Examples 4–5

These compositions were prepared to compare the performance of antioxidants (Ol 540, A494, HSC) and a dihydroxy metal compound alone (DHAA) with combinations of the invention on pH stability. The compositions were prepared by mixing in order: AQS2540, L735A, stabilizer, with Trisamino or P200 added before DHAA. The compositions tested are shown in Table 7 and the resulting pH aging data are shown in Table 8. The data show that the use of DHAA or HSC alone improves pH stability, however, a hard and caked sediment was formed indicating settling of the DHAA and HSC due to their high specific gravity. The combination of DHAA and P200 provided improved pH stability as compared with the other compositions in this Table.

TABLE 7

| Component | C-34 | C-35 | C-36 | C-37 | C-38 | Ex. 4 | Ex. 5 |
|---|---|---|---|---|---|---|---|
| L735A (phr) | 50 | 50 | 50 | 50 | 50 | 50 | 50 |
| AQS2540 | 100 | 100 | 100 | 100 | 100 | 100 | 100 |
| Ol 640 (phr) |  |  |  | 4.5 |  |  |  |
| A494 (phr) |  |  |  |  | 4.5 |  |  |
| DHAA (phr) |  | 2.25 |  |  |  | 2.25 | 2.25 |
| HSC (phr) |  |  | 2.25 |  |  |  |  |
| Trisamino (phr) |  |  |  |  |  | 2.25 |  |
| P200 (phr) |  |  |  |  |  |  | 2.25 |

TABLE 8

| pH | C-34 | C-35 | C-36 | C-37 | C-38 | Ex. 4 | Ex. 5 |
|---|---|---|---|---|---|---|---|
| Initial | 12.44 | 10.64 | 10.92 | 12.32 | 12.43 | 10.75 | 10.72 |
| 24 Hours | 12.21 | 10.14 | 10.65 | 11.83 | 12.28 | 10.31 | 10.28 |
| 72 Hours | 12.20 | 9.98 | 10.57 | 11.21 | 12.18 | 10.12 | 10.19 |
| 1 Week | 12.13 | 9.70 | 10.49 | 10.42 | 11.16 | 9.96 | 10.04 |
| 2 Weeks | 11.87 | 9.58 | 10.40 | 9.92 | 11.10 | 9.81 | 9.98 |
| 3 Weeks | 11.62 | 9.67 | 10.43 | 9.66 | 10.40 | 9.86 | 10.05 |
| 4 Weeks | 10.58 | 9.30 | 10.24 | 9.41 | 10.04 | 9.64 | 9.82 |
| 5 Weeks | 10.18 | 9.21 | 10.06 | 9.19 | 9.56 | 9.31 | 9.61 |
| 6 Weeks | 9.89 | 9.39 | 10.16 | 9.20 | 9.69 | 9.46 | 9.80 |
| 7 Weeks | 9.59 | 9.22 | 9.94 | 9.04 | 9.47 | 9.33 | 9.60 |
| 8 Weeks | 9.29 | 9.31 | 9.96 | 8.95 | 9.29 | 9.45 | 9.67 |
| 10 Weeks | 8.99 | 9.18 | 9.85 | 8.72 | 8.99 | 9.31 40% Solid | 9.53 |
| 11 Weeks | 8.87 | 9.21 | 9.85 | 8.58 | 8.85 |  | 9.55 |
| 14 Weeks | 8.77 | 9.08 | 9.63 | 8.15 | 8.49 |  | 9.41 |
| 15 Weeks | 8.74 | Solid | 9.60 | 7.98 | 8.38 |  | 9.33 |
| 16 Weeks | Solid |  | 9.51 | 7.85 | 8.26 |  | 9.25 |

Comparative Examples C-39–C-43 and Examples 6–7

These compositions were prepared to compare the performance of antioxidants and a dihydroxy metal compound alone with combinations of the invention on pH stability. The compositions were prepared as described in Examples 4–5 and Comparative Examples C-34–C-38 above. The compositions tested are shown in Table 9 and the resulting pH aging data are shown in Table 10. The data show that antioxidant alone slightly improved pH stability as compared to the control (C-39). The use of the combination of DHAA and Trisamino and the combination of DHAA and P200, both of the invention, improved pH stability as compared to the use of DHAA alone. The use of DHAA and HSC alone resulted in sediment being formed indicating settling of the DHAA and HSC due to their high specific gravity.

TABLE 9

| Component | C-39 | C-40 | C-41 | C-42 | C-43 | Ex. 6 | Ex. 7 |
|---|---|---|---|---|---|---|---|
| L735A (phr) | 50 | 50 | 50 | 50 | 50 | 50 | 50 |
| AQS2540 | 100 | 100 | 100 | 100 | 100 | 100 | 100 |
| U54 (phr) | 37.5 | 37.5 | 37.5 | 37.5 | 37.5 | 37.5 | 37.5 |
| A310S (phr) | 93.75 | 93.75 | 93.75 | 93.75 | 93.75 | 93.75 | 93.75 |
| Ol 640 (phr) | | | | 8.44 | | | |
| A494 (phr) | | | | | 8.44 | | |
| DHAA (phr) | | 4.22 | | | | 4.22 | 4.22 |
| HSC (phr) | | | 4.22 | | | | |
| Trisamino (phr) | | | | | | 2.81 | |
| P200 (phr) | | | | | | | 4.22 |

TABLE 10

| pH | C-39 | C-40 | C-41 | C-42 | C-43 | Ex. 6 | Ex. 7 |
|---|---|---|---|---|---|---|---|
| Initial | 8.86 | 8.85 | 9.04 | 8.85 | 8.84 | 9.27 | 8.78 |
| 24 Hours | 8.78 | 8.93 | 9.09 | 8.80 | 8.80 | 9.28 | 9.00 |
| 72 Hours | 8.73 | 8.92 | 9.01 | 8.72 | 8.73 | 9.23 | 8.95 |
| 1 Week | 8.50 | 8.74 | 8.84 | 8.54 | 8.57 | 9.13 | 8.81 |
| 2 Weeks | 8.26 | 8.65 | 8.65 | 8.32 | 8.36 | 9.02 | 8.64 |
| 3 Weeks | 8.06 | 8.69 | 8.59 | 8.19 | 8.27 | 9.17 | 8.71 |
| 4 Weeks | 7.65 | 8.41 | 8.32 | 7.90 | 7.99 | 8.92 | 8.46 |
| 5 Weeks | 7.47 | 8.17 | 7.99 | 7.65 | 7.60 | 8.60 | 8.19 |
| 6 Weeks | 7.37 | 8.32 | 8.09 | 7.63 | 7.70 | 8.74 | 8.28 |
| 7 Weeks | 7.11 | 8.04 | 7.86 | 7.45 | 7.51 | 8.54 | 8.10 |
| 8 Weeks | 6.92 | 8.02 | 7.81 | 7.32 | 7.39 | 8.69 | 8.17 |
| 10 Weeks | 6.72 | 7.80 | 7.58 | 7.02 | 7.10 | 8.43 | 7.99 |
| 11 Weeks | 6.40 | 7.84 | 7.57 | 6.90 | 7.00 | 8.59 | 7.96 |
| 14 Weeks | 6.08 | 7.39 | 7.36 | 6.54 | 6.67 | 8.51 | 7.80 |
| 15 Weeks | 5.85 | 7.21 | 7.24 | 6.35 | 6.46 | 8.42 | 7.72 |
| 16 Weeks | 5.66 | 7.03 | 7.15 | 6.18 | 6.30 | 8.35 | 7.50 |

Comparative Examples C-44–C-49 and Examples 8–9

These Comparative Examples and Examples were prepared to compare the use of TrisaminoK and Trisamino alone with the combination of Trisamino and P200 on pH stability. The compositions were prepared by adding in order AQS2540, L735A, A310S, U54, TrisaminoK, Trisamino, and P200. The compositions tested are shown in Table 11 and the resulting pH aging data are shown in Table 12. The data show the combination of branched primary amino alcohol (Trisamino) and polycarbodiimide (P200) provided improved pH stability when compared to branched primary amino alcohol (Trisamino) (with or without potassium dihydrogen phosphate) alone.

TABLE 11

| Component | C-44 | C-45 | C-46 | C-47 | C-48 | C-49 | Ex. 8 | Ex. 9 |
|---|---|---|---|---|---|---|---|---|
| L735A (phr) | 50 | 50 | 50 | 50 | 50 | 50 | 50 | 50 |
| AQS2540 | 100 | 100 | 100 | 100 | 100 | 100 | 100 | 100 |
| U54 (phr) | | 37.5 | | 37.5 | | 37.5 | | 37.5 |
| A310S (phr) | | 93.75 | | 93.75 | | 93.75 | | 93.75 |
| TrisaminoK (phr) | | | 2.25 | 4.22 | | | | |
| Trisamino (phr) | | | | | 2.25 | 4.22 | 2.25 | 4.22 |
| P200 (phr) | | | | | | | 2.25 | 4.22 |

TABLE 12

| pH | C-44 | C-45 | C-46 | C-47 | C-48 | C-49 | Ex. 8 | Ex. 9 |
|---|---|---|---|---|---|---|---|---|
| Initial | 12.49 | 8.84 | 10.81 | 8.86 | 12.44 | 9.33 | 12.47 | 9.34 |
| 24 Hours | 12.44 | 8.81 | 10.77 | 8.84 | 12.43 | 9.29 | 12.46 | 9.37 |
| 1 Week | 12.14 | 8.47 | 10.28 | 8.67 | 12.14 | 9.08 | 12.24 | 9.17 |
| 2 Weeks | 11.9 | 8.16 | 9.96 | 8.52 | 11.92 | 8.85 | 12.12 | 9.00 |
| 3 Weeks | 11.13 | 7.72 | 9.67 | 8.32 | 11.61 | 8.70 | 11.88 | 8.81 |
| 4 Weeks | 10.49 | 7.57 | 9.55 | 8.21 | 10.93 | 8.58 | 11.69 | 8.78 |
| 5 Weeks | 9.90 | 7.21 | 9.31 | 8.05 | 10.37 | 8.59 | 11.26 | 8.66 |
| 6 Weeks | 9.36 | 6.83 | 9.14 | 7.71 | 9.80 | 8.19 | 10.65 | 8.38 |
| 8 Weeks | 9.06 | 6.66 | 8.99 | 7.50 | 9.54 | 7.93 | 10.43 | 8.10 |
| 11 Weeks | 8.82 | 6.28 | 9.08 | 7.42 | 9.36 | 7.98 | 10.15 | 8.23 |
| 12 Weeks | 8.74 | 6.06 | Solid | Semi-Solid | 9.28 | 7.77 | 9.97 | 8.08 |
| 14 Weeks | Solid | 5.87 | | Solid | 9.20 | 7.51 | 9.73 | 7.92 |

Comparative Examples C-50–C-55 and Examples 10–11

These compositions were prepared to compare the use of either Trisamino or P200 alone with combinations of both in polymer systems containing polychloroprene, polyester polyurethane, and butyl acrylate/methylmethacrylate copolymer, with the polyester polyurethane being the dominant polymer. The compositions were prepared by mixing in order: U54, A310S, AQS1120, Ol 640, Trisamino, and P200. The compositions are shown in Table 13 and the resulting pH aging data is shown in Table 14. The data show improved pH stability when branched primary amino alcohol (Trisamino) is combined with polycarbodiimide (P200) when compared to either alone in compositions containing polychloroprene, polyester polyurethane and acrylic ester copolymer.

TABLE 13

| Component | C-50 | C-51 | C-52 | C-53 | C-54 | C-55 | Ex. 10 | Ex. 11 |
|---|---|---|---|---|---|---|---|---|
| AQS1120 (phr) | 100 | 66.6 | 66.6 | 66.6 | 66.6 | 66.6 | 66.6 | 66.6 |
| U54 | | 100 | 100 | 100 | 100 | 100 | 100 | 100 |
| A310S (phr) | | 4.17 | 4.17 | 4.17 | 4.17 | 4.17 | 4.17 | 4.17 |
| Ol 640 (phr) | | | 2.73 | 2.73 | 2.73 | 2.73 | 2.73 | 2.73 |
| Trisamino (phr) | | 2.56 | | 3.42 | | | 2.56 | 3.42 |
| P200 (phr) | | | 2.56 | | 3.42 | 2.56 | 3.42 | |

TABLE 14

| pH | C-50 | C-51 | C-52 | C-53 | C-54 | C-55 | Ex. 10 | Ex. 11 |
|---|---|---|---|---|---|---|---|---|
| Initial | 6.95 | 7.19 | 8.69 | 7.37 | 8.83 | 7.35 | 8.68 | 8.85 |
| 24 Hours | 6.91 | 7.04 | 8.31 | 7.11 | 8.42 | 7.11 | 8.34 | 8.45 |
| 3 Weeks | 6.38 | 6.57 | 8.22 | 6.60 | 8.41 | 6.57 | 8.27 | 8.46 |
| 4 Weeks | 6.10 | 6.31 | 8.10 | 6.36 | 8.30 | 6.33 | 8.14 | 8.37 |
| 5 Weeks | 5.89 | 6.10 | 7.99 | 6.21 | 8.22 | 6.20 | 8.05 | 8.29 |
| 6 Weeks | 5.64 | 5.85 | 7.67 | 6.03 | 7.93 | 6.04 | 7.71 | 8.03 |
| 7 Weeks | 5.47 | 5.66 | 7.52 | 5.92 | 7.80 | 5.91 | 7.61 | 7.92 |
| 8 Weeks | 5.46 | 5.62 | 7.70 | 5.95 | 7.98 | 5.94 | 7.82 | 8.12 |
| 9 Weeks | 5.29 | 5.45 | 7.49 | 5.84 | 7.80 | 5.85 | 7.62 | 7.97 |
| 10 Weeks | 5.08 | 5.28 | 7.30 | 5.69 | 7.57 | 5.71 | 7.40 | 7.74 |
| 11 Weeks | 5.03 | 5.14 | 7.33 | 5.69 | 7.69 | 5.78 | 7.52 | 7.92 |
| 12 Weeks | 4.97 | 5.05 | 7.27 | 5.68 | 7.63 | 5.69 | 7.49 | 7.88 |
| 13 Weeks | 4.83 | 4.86 | 6.98 | 5.53 | 7.30 | 5.55 | 7.17 | 7.59 |
| 15 Weeks | 4.61 | 4.63 | 6.76 | 5.55 | 7.17 | 5.50 | 7.14 | 7.63 |

Comparative Examples C-56–C-57 and Examples 12–15

These compositions were prepared to demonstrate the effect of using stabilizer systems of the invention in compositions containing carboxylated polyester polyurethane dispersion. The compositions were prepared by adding in order: DEP170, A310S, DT50, Ol 640, Trisamino, P200, and DHAA. The compositions tested are shown in Table 15 and the resulting pH aging data are shown in Table 16. The data clearly show that the use of examples of the invention provides improved pH stability as compared with antioxidant alone.

TABLE 15

| Component | C-56 | C-57 | Ex. 12 | Ex. 13 | Ex. 14 | Ex. 15 |
|---|---|---|---|---|---|---|
| DEP170 | 100 | 100 | 100 | 100 | 100 | 100 |
| DT50 (phr) | 20.01 | 20.02 | 20.02 | 20.01 | 20.01 | 20.01 |
| A310 (phr) | 8.01 | 8.02 | 8.02 | 8.02 | 8.02 | 8.02 |
| Ol 640 (phr) | | 1.71 | 1.72 | | 1.71 | 1.72 |
| DHAA (phr) | | | | | 1.49 | 1.48 |
| Trisamino (phr) | | | 1.50 | 1.50 | 1.50 | |
| P200 (phr) | | | 1.48 | 1.49 | | 1.48 |

TABLE 16

| pH | C-56 | C-57 | Ex. 12 | Ex. 13 | Ex. 14 | Ex. 15 |
|---|---|---|---|---|---|---|
| Initial | 7.15 | 7.15 | 8.65 | 8.60 | 8.62 | 7.38 |
| 1 Week | 7.11 | 7.08 | 8.56 | 8.53 | 8.49 | 7.40 |
| 2 Weeks | 6.95 | 6.89 | 8.33 | 8.32 | 8.29 | 7.26 |
| 4 Weeks | 6.52 | 6.46 | 8.01 | 7.98 | 7.97 | 6.98 |

Comparative Examples C-58–C-63 and Examples 16–25

These compositions were prepared to demonstrate the use of magnesium oxide in combination with dihydroxy metal compound (DHAA), branched primary amino alcohol (Trisamino), polycarbodiimide (P200), and combinations thereof, in the presence of sulfonated polyester polyurethane dispersions. The compositions were prepared by adding in order: polyester polyurethane, Trisamino, P200, DHAA, and MgO. Compositions are shown in Table 17 and the resulting pH aging data are shown in Table 18. The data show that the use of MgO and DHAA results in sediment being formed, in the absence of acrylic ester copolymer or other appropriate component which modifies rheology. The addition of MgO to compositions also raised the initial pH of those compositions. Discoloration of DDS3507 was noted in the absence of any stabilizing ingredient.

TABLE 17

| Component | C-58 | C-59 | C-60 | C-61 | C-62 | C-63 |
|---|---|---|---|---|---|---|
| U53 | | 100 | 100 | | 100 | |
| DDS3507 | 100 | | | 100 | | 100 |
| DHAA (phr) | | | 1.5 | 1.5 | 1.5 | 1.5 |
| MgO (phr) | | | 1.0 | 1.0 | 1.0 | 1.0 |
| Trisamino (phr) | | | 1.5 | 1.5 | | |
| P200 (phr) | | | | | 1.5 | 1.5 |

| Component | Ex. 16 | Ex. 17 | Ex. 18 | Ex. 19 | Ex. 20 |
|---|---|---|---|---|---|
| U53 | 100 | | 100 | | 100 |
| DDS3507 | | 100 | | 100 | |
| DHAA (phr) | | | | | |
| MgO (phr) | 1.0 | 1.0 | 1.0 | 1.0 | 1.0 |
| Trisamino (phr) | | 1.5 | | 1.5 | 1.5 |
| P200 (phr) | 1.5 | 1.5 | | | 1.5 |

| Component | Ex. 21 | Ex. 22 | Ex. 23 | Ex. 24 | Ex. 25 |
|---|---|---|---|---|---|
| U53 | | 100 | | 100 | |
| DDS3507 | 100 | | 100 | | 100 |
| DHAA (phr) | | | | | |
| MgO (phr) | 1.0 | 0.5 | 0.5 | 0.5 | 0.5 |
| Trisamino (phr) | 1.5 | 1.5 | 1.5 | 1.0 | 1.0 |
| P200 (phr) | 1.5 | 1.5 | 1.5 | 1.0 | 1.0 |

TABLE 18

| pH | C-58 | C-59 | C-60 | C-61 | C-62 | C-63 |
|---|---|---|---|---|---|---|
| Initial | 7.81 | 8.29 | 9.43 | 9.37 | 9.07 | 9.08 |
| 48 Hours | 7.50 | 7.41 | 9.16 | 9.15 | 9.25 | 9.09 |
| 1 Week | 7.44 | 6.96 | 8.83 5% Sediment | 8.89 5% Sediment | 9.18 12% Sediment | 9.35 2.5% Sediment |
| 2 Weeks | 7.70 | 7.07 | 9.10 5% Sediment | 8.98 5% Sediment | 9.24 12% Sediment | 9.27 5% Sediment |
| 3 Weeks | 7.56 | 6.84 | 9.03 5% Sediment | 8.93 5% Sediment | 9.10 12% Sediment | 8.92 5% Sediment |
| 4 Weeks | 7.44 | 6.73 | 8.90 5% Sediment | 8.73 5% Sediment | 9.07 12% Sediment | 8.45 5% Sediment |
| 5 Weeks | 7.25 | 6.59 | 8.73 7.5% Sediment | 8.46 5% Sediment | 8.81 12% Sediment | 8.15 5% Sediment |
| 6 Weeks | 7.23 Amber | 6.70 | 8.68 10% Sediment | 8.47 5% Sediment | 8.82 30% Sediment | 7.88 10% Sediment |

| pH | Ex. 16 | Ex. 17 | Ex. 18 | Ex. 19 | Ex. 20 |
|---|---|---|---|---|---|
| Initial | 10.52 | 10.41 | 10.56 | 10.46 | 10.54 |
| 48 Hours | 9.70 | 9.79 | 9.69 | 9.79 | 9.73 |
| 1 Weeks | 8.50 | 8.95 | 8.85 | 8.99 | 8.93 |
| 2 Weeks | 8.44 | 8.82 | 9.00 | 9.02 | 9.14 |
| 3 Weeks | 8.36 1% Sediment | 8.33 | 8.84 2.5% Sediment | 8.79 | 9.08 2.5% Sediment |
| 4 Weeks | 8.14 1% Sediment | 8.02 | 8.48 12.5% Sediment | 8.53 | 8.76 2.5% Sediment |
| 5 Weeks | 8.00 1% Sediment | 7.83 | 8.25 30% Sediment | 8.22 7.5% Sediment | 8.46 7.5% Sediment |
| 6 Weeks | 7.79 5% Sedi- | 7.76 | | 8.29 10% Sedi- | 8.40 30% Sedi- |

TABLE 18-continued

| pH | Ex. 21 | Ex. 22 | Ex. 23 | Ex. 24 | Ex. 25 |
|---|---|---|---|---|---|
| Initial | 10.42 | 10.43 | 10.32 | 10.51 | 10.31 |
| 48 Hours | 9.76 | 9.84 | 9.73 | 9.75 | 9.67 |
| 1 Weeks | 9.06 | 9.06 1% Sediment | 9.06 1% Sediment | 8.96 | 8.97 1% Sediment |
| 2 Weeks | 9.12 | 9.21 1% Sediment | 9.11 1% Sediment | 9.09 | 8.97 1% Sediment |
| 3 Weeks | 8.91 1% Sediment | 9.11 1% Sediment | 8.89 1% Sediment | 9.01 | 8.77 1% Sediment |
| 4 Weeks | 8.64 1% Sediment | 8.90 1% Sediment | 8.64 1% Sediment | 8.78 | 8.51 1% Sediment |
| 5 Weeks | 8.34 1% Sediment | 8.60 1% Sediment | 8.36 1% Sediment | 8.44 | 8.25 1% Sediment |
| 6 Weeks | 8.46 1% Sediment | 8.48 15% Sediment | 8.14 1% Sediment | 8.27 30% Sediment | 7.99 1% Sediment |

Comparative Examples C-64–C-66 and Examples 26–29

These compositions contained polychloroprene, polyester polyurethane, and acrylic ester copolymer. The compositions were prepared by adding in order: DDS3507, A310S, AQS1120, Ol 640, Trisamino, P200, DHAA, and MgO. The compositions are shown in Table 19 and the resulting pH aging data is shown in Table 20. The data show that the use of the stabilizer systems of Examples 26–29 provide improved pH stability with lower amounts of sediment when compared with the use of the combination of MgO and DHAA.

TABLE 19

| Component | C-64 | C-65 | C-66 | Ex. 26 | Ex. 27 | Ex. 28 | Ex. 29 |
|---|---|---|---|---|---|---|---|
| DDS3507 | 100 | 100 | 100 | 100 | 100 | 100 | 100 |
| A310S (phr) | 4.07 | 4.07 | 4.07 | 4.07 | 4.07 | 4.07 | 4.07 |
| AQS1120 | 74 | 74 | 74 | 74 | 74 | 74 | 74 |

TABLE 19-continued

| Component | C-64 | C-65 | C-66 | Ex. 26 | Ex. 27 | Ex. 28 | Ex. 29 |
|---|---|---|---|---|---|---|---|
| (phr) | | | | | | | |
| Ol 640 (phr) | 2.67 | 2.67 | 2.67 | 2.67 | 2.67 | 2.67 | 2.67 |
| MgO (phr) | 1.67 | 1.67 | 1.67 | 1.67 | 0.83 | 1.67 | 1.67 |
| DHAA (phr) | 2.5 | 2.5 | 2.5 | | | | |
| Trisamino (phr) | | 2.5 | | 1.67 | 1.63 | | 2.5 |
| P200 (phr) | 2.5 | | | 1.67 | 1.67 | 2.5 | |

TABLE 20

| pH | C-64 | C-65 | C-66 | Ex. 26 | Ex. 27 | Ex. 28 | Ex. 29 |
|---|---|---|---|---|---|---|---|
| Initial | 8.88 | 8.95 | 8.67 | 9.05 | 8.96 | 8.83 | 9.04 |
| 48 Hours | 8.77 | 8.92 | 8.87 | 9.24 | 9.20 | 9.23 | 9.32 |
| 1 Week | 9.00 | 8.57 | 9.16 | 8.99 | 8.89 | 8.96 | 9.11 |
| 2 Weeks | 9.18 | 8.71 | 9.24 | 9.12 | 8.95 | 9.08 | 9.17 |
| 3 Weeks | 8.87 5% Sediment | 8.55 5% Sediment | 8.95 5% Sediment | 9.02 | 8.68 | 8.98 | 8.99 |
| 4 Weeks | 8.56 1% Sediment | 8.38 5% Sediment | 8.66 5% Sediment | 8.88 | 8.38 | 8.90 | 8.84 |
| 5 Weeks | 8.23 1% sediment | 8.23 7.5% Sediment | 8.37 5% Sediment | 8.66 | 8.12 | 8.73 | 8.67 |
| 6 Weeks | 7.95 1% Sediment | 8.27 12.5% Sediment | 7.99 12.5% Sediment | 8.38 | 7.94 | 8.33 | 8.41 |

Comparative Examples C-67–C-72 and Examples 30–32

These compositions were prepared to compare combinations of MgO, DHAA, and P200 with combinations containing no MgO in dispersions containing carboxylated polyester polyurethane. The compositions are shown in Table 21 and the resulting pH aging data is shown in Table 22. The data show that the addition of MgO to the illustrated stabilizer systems was detrimental to the pH stability of the carboxylated polyester polyurethane.

TABLE 21

| Components | C-67 | C-68 | C-69 | C-70 | C-71 | C-72 | Ex. 30 | Ex. 31 | Ex. 32 |
|---|---|---|---|---|---|---|---|---|---|
| DEP172 | 100 | 100 | 100 | 100 | 100 | 100 | 100 | 100 | 100 |
| MgO (phr) | | 1.00 | 1.00 | 1.00 | 1.00 | 1.00 | | | |
| DHAA (phr) | | | 1.50 | 1.50 | | | | 1.50 | 1.50 |
| Trisamino (phr) | | 1.51 | | 1.50 | 1.51 | | 1.50 | 1.50 | |
| P200 (phr) | | | 1.50 | | 1.50 | 1.50 | 1.50 | | 1.50 |

TABLE 22

| pH | C-67 | C-68 | C-69 | C-70 | C-71 | C-72 | Ex. 30 | Ex. 31 | Ex. 32 |
|---|---|---|---|---|---|---|---|---|---|
| Initial | 7.39 | 9.06 | 8.17 | 8.91 | 9.02 | 7.97 | 8.92 | 8.85 | 7.56 |
| 3 Days | 7.32 | 9.45 | 9.36 | 9.30 | 9.35 | 9.30 | 8.81 | 8.62 | 7.51 |
| 1 Week | 7.39 | Coagulated | Coagulated | Coagulated | Coagulated | Coagulated | 8.78 | 8.62 | 7.60 |
| 2 Weeks | 7.07 | | | | | | 8.67 | 8.46 | 7.43 |
| 3 Weeks | 6.98 | | | | | | 8.61 | 8.36 | 7.34 |
| 4 Weeks | 6.79 | | | | | | 8.36 | 8.12 | 7.05 |
| 6 Weeks | 6.34 | | | | | | 8.26 | 7.94 | 6.73 |

Comparative Example C-73–C-78 and Examples 33–35

These compositions were prepared to compare the performance of stabilizer systems of the invention with comparative stabilizer systems in compositions containing carboxylated polyester polyurethane and acrylic ester copolymer. The compositions tested are shown in Table 23 and the resulting pH aging data are shown in Table 24. The data show the inclusion of MgO into compositions containing particular carboxylated polyester polyurethane was detrimental to the stability of the composition.

TABLE 25

| Components | C-79 | C-80 | C-81 | C-82 | C-83 | C-84 |
|---|---|---|---|---|---|---|
| AQS2540 | 100 | 100 | 100 | 100 | 100 | 100 |
| L735A | 50 | 50 | 50 | 50 | 50 | 50 |
| U54 (phr) | | | | 37.5 | 37.5 | 37.5 |
| A310S (phr) | | | | 93.75 | 93.75 | 93.75 |
| ZnO (phr) | | 2.25 | 3 | | 4.22 | 5.63 |

TABLE 23

| Components | C-73 | C-74 | C-75 | C-76 | C-77 | C-78 | Ex. 33 | Ex. 34 | Ex. 35 |
|---|---|---|---|---|---|---|---|---|---|
| DEP170 | 100 | 100 | 100 | 100 | 100 | 100 | 100 | 100 | 100 |
| A310 (phr) | 7.99 | 8.00 | 8.00 | 8.00 | 8.00 | 7.99 | 7.99 | 7.99 | 7.99 |
| MgO (phr) | | 1.01 | 1.01 | 1.00 | 1.01 | 1.00 | | | |
| DHAA (phr) | | | 1.50 | 1.50 | | | | 1.50 | 1.50 |
| Trisamino (phr) | | 1.50 | | 1.50 | 1.50 | | 1.50 | 1.50 | |
| P200 (phr) | | | 1.50 | 1.50 | | 1.50 | 1.50 | | 1.50 |

TABLE 24

| pH | C-73 | C-74 | C-75 | C-76 | C-77 | C-78 | Ex. 33 | Ex. 34 | Ex. 35 |
|---|---|---|---|---|---|---|---|---|---|
| Initial | 7.00 | 9.50 | 9.00 | 8.95 | 9.46 | 9.09 | 8.61 | 8.60 | 7.23 |
| 3 Days | 7.10 | 9.57 | 9.51 | 9.50 | 9.56 | 9.48 | 8.76 | 8.64 | 7.45 |
| 1 Week | 7.02 | 9.43 | 9.38 | Coagulated | 9.41 | 9.32 | 8.67 | 8.51 | 7.46 |
| 2 Weeks | 6.83 | Coagulated | 9.18 | | Coagulated | Coagulated | 8.51 | 8.36 | 7.35 |
| 3 Weeks | 6.69 | | Coagulated | | | | 8.41 | 8.25 | 7.29 |
| 4 Weeks | 6.51 | | | | | | 8.21 | 8.02 | 7.06 |
| 5 Weeks | | | | | | | | | |
| 6 Weeks | 6.06 | | | | | | 7.96 | 7.76 | 6.79 |

Comparative Examples C-79–C-84

These compositions were prepared to evaluate the impact on pH change using only zinc oxide as the acid scavenger in compositions containing anionic rosin acid stabilized polychloroprene as the dominant polymer. The compositions are shown in Table 25 and the corresponding pH aging data is shown in Table 26. The components are present in phr of AQS2540. The data show that ZnO is ineffective as a stabilizer in polymer systems containing polychloroprene as compared with the control (C-79 and C-82).

TABLE 26

| pH | C-79 | C-80 | C-81 | C-82 | C-83 | C-84 |
|---|---|---|---|---|---|---|
| Initial | 12.35 | 12.35 | 12.36 | 8.74 | 8.87 | 8.93 |
| 24 Hours | 12.30 | 12.28 | 12.25 | 8.75 | 8.83 | 8.89 |
| 96 Hours | 12.04 | 12.01 | 11.97 | 8.51 | 8.55 | 8.62 |
| 1 Week | 11.99 | 12.01 | 11.96 | 8.39 | 8.40 | 8.47 |
| 2 Weeks | 11.41 | 11.59 | 11.50 | 8.14 | 8.05 | 8.10 |
| 3 Weeks | 10.36 | 10.86 | 10.87 | 7.93 | 7.82 | 7.82 |
| 4 Weeks | 9.85 | 10.34 | 10.41 | 7.69 | 7.61 | 7.57 |
| 5 Weeks | 9.59 | 10.16 | 10.19 | 7.45 | 7.32 | 7.28 |
| 7 Weeks | 8.79 | 9.50 | 9.56 | 7.35 | 6.79 | 6.86 |
| 8 Weeks | 8.58 | 9.37 | 9.39 | 6.55 | 6.45 | 6.50 |

TABLE 26-continued

| pH | C-79 | C-80 | C-81 | C-82 | C-83 | C-84 |
|---|---|---|---|---|---|---|
| 10 Weeks | 8.31 | 8.94 | 9.24 | 6.62 | 6.54 | Solid |
| 13 Weeks | 8.56 | 9.02 | 9.01 | 5.26 | Solid | |
| | Semi-Solid | Semi-Solid | Semi-Solid | Semi-Solid | | |

Comparative Examples C-85–C-90

These compositions were prepared to evaluate the impact on pH change using only ZnO as the acid scavenger in polymer systems containing non-ionic stabilized methacrylic acid-containing polychloroprene. The compositions are shown in Table 27 and the resulting pH aging data is shown in Table 28. The data show that the use of ZnO as an acid scavenger provided a slight improvement in pH decline over time, compared to a control, but resulted in the compositions becoming more viscous over time due to the ZnO reacting with the acrylic functionality of the polychloroprene as the pH decreases. The observations noted were made visually.

TABLE 27

| Components | C-85 | C-86 | C-87 | C-88 | C-89 | C-90 |
|---|---|---|---|---|---|---|
| AQS1120 | 100 | 100 | 100 | 100 | 100 | 100 |
| U54 (phr) | | 150.15 | | 150.15 | | 150.15 |
| A310S (phr) | | 6.25 | | 6.25 | | 6.25 |
| ZnO (phr) | | | 1.5 | 3.85 | 2 | 5.13 |

TABLE 28

| pH | C-85 | C-86 | C-87 | C-88 | C-89 | C-90 |
|---|---|---|---|---|---|---|
| Initial | 7.03 | 7.20 | 7.25 | 7.52 | 7.31 | 7.61 |
| 24 Hours | 6.99 | 7.14 | 7.84 | 7.98 | 7.92 | 8.04 |
| 96 Hours | 6.80 | 6.94 | 7.53 | 7.60 | 7.62 | 7.62 |
| 1 Week | 6.68 | 6.81 | 7.33 | 7.41 | 7.47 | 7.41 |
| 2 Weeks | 6.42 | 6.54 | 6.75 | 6.93 | 7.10 | 7.00 |
| 3 Weeks | 6.23 | 6.35 | 6.37 | 6.74 | 6.92 | 6.91 |
| 4 Weeks | 6.06 | 6.17 | 6.25 | 6.69 | 6.89 | 6.90 |
| 5 Weeks | 5.81 | 5.90 | 5.79 | 6.19 | 6.43 | 6.47 |
| 7 Weeks | 5.50 | 5.56 | 5.85 | 6.42 | 6.59 | 6.56 |
| 8 Weeks | 5.07 | 5.20 | 5.53 | Solid | 6.18 | Solid |
| 9 Weeks | 5.14 | 5.26 | 5.64 | | 6.06 | |
| 13 Weeks | 4.21 | 4.05 | 5.27 | | 5.57 | |
| | | Semi-Solid | Semi-Solid | | Semi-Solid | |

Comparative Examples C-91–C-100

These compositions were prepared to evaluate the impact on pH stability of using only zinc oxide as the acid scavenger in dispersions of sulfonated or carboxylated polyurethanes. The compositions were prepared by adding in order: polyester polyurethane and ZnO. The compositions are shown in Table 29 and the resulting pH aging data is shown in Table 30. The data show that ZnO does not provide improved pH stability for polymer systems containing only sulfonated or carboxylated polyester polyurethane dispersions as demonstrated by substantial decreases in pH over time.

TABLE 29

| Component | C-91 | C-92 | C-93 | C-94 | C-95 |
|---|---|---|---|---|---|
| U54 | | 100 | | | |
| U53 | 100 | | | | |
| DDS3507 | | | 100 | | |
| DEP 172 | | | | 100 | |
| DEP 170 | | | | | 100 |
| ZnO (phr) | 1 | 1 | 1 | 1 | 1 |

| Component | C-96 | C-97 | C-98 | C-99 | C-100 |
|---|---|---|---|---|---|
| U54 | | 100 | | | |
| U53 | 100 | | | | |
| DDS3507 | | | 100 | | |
| DEP 172 | | | | 100 | |
| DEP 170 | | | | | 100 |
| ZnO (phr) | | 3 | 3 | 3 | 3 |

TABLE 30

| pH | C-91 | C-92 | C-93 | C-94 | C-95 |
|---|---|---|---|---|---|
| Initial | 8.09 | 8.17 | 8.12 | 8.29 | 8.19 |
| 48 Hours | 7.70 | 7.77 | 7.76 | 8.14 | 8.08 |
| 10 Days | 7.78 | 7.67 | 7.79 | 7.82 | 7.69 |
| 18 Days | 7.80 | 7.72 | 7.90 | 7.68 | 7.40 |
| 3 Weeks | 7.29 | 7.13 | 7.50 | 6.96 | 6.89 |
| 37 Days | 7.07 | 6.90 | 7.27 | 6.47 | 6.16 |
| | | | | 50% Solid | Semi-Solid |
| 44 Days | 6.81 | 6.29 | 6.46 | | |
| 50 Days | 6.45 | 6.17 28% Sediment | 6.38 | | |
| 58 Days | 6.62 | | 6.11 | | |

| pH | C-96 | C-97 | C-98 | C-99 | C-100 |
|---|---|---|---|---|---|
| Initial | 8.54 | 8.28 | 8.09 | 8.45 | 8.33 |
| 48 Hours | 7.90 | 7.87 | 7.82 | 8.14 | 8.09 |
| 10 Days | 7.78 | 7.83 | 7.90 | 7.86 | 7.69 |
| 18 Days | 7.82 | 7.78 | 7.99 | 7.63 | 7.51 |
| 3 Weeks | 7.37 | 7.28 | 7.58 | 7.14 | 6.90 |
| 37 Days | 7.38 | 7.08 | 7.26 | 6.56 Coagulated | 6.35 Semi-Solid |
| 44 Days | 6.47 | 6.25 Semi-Solid | 6.30 | | |
| 50 Days | 6.47 | | 6.28 8% Sediment | | |
| 58 Days | 6.37 8% Sediment | | | | |

Comparative Examples C-101–C-104

These compositions were prepared to evaluate the performance of ZnO as a stabilizer in polymer systems containing polychloroprenes and polyester polyurethane. The compositions were prepared by adding in order: U54, A310S, polychloroprene, and ZnO. The compositions are shown in Table 31 and the resulting pH aging data is shown in Table 32. The data show that ZnO alone was ineffective as a stabilizer as demonstrated by substantial declines in pH over time.

TABLE 31

| Components | C-101 | C-102 | C-103 | C-104 |
|---|---|---|---|---|
| U54 | 100 | 100 | 100 | 100 |
| DDS3507 | | | | |
| AQS1120 (phr) | 66.6 | | | |
| L735A (phr) | | 66.6 | | |
| AQS0033 (phr) | | | 66.6 | |
| AQS2540 (phr) | | | | 66.6 |
| A310S (phr) | 4.17 | 4.24 | 4.2 | 3.83 |
| O1 640 (phr) | | | | |
| ZnO (phr) | 5 | 5.09 | 5.04 | 4.59 |

TABLE 32

| pH | C-101 | C-102 | C-103 | C-104 |
|---|---|---|---|---|
| Initial | 7.83 | 9.70 | 9.96 | 10.89 |
| 48 Hours | 7.58 | 8.82 | 8.88 | 9.08 |
| 10 Days | 7.38 | 7.96 | 7.98 | 8.25 |
| 18 Days | 7.18 | 7.48 | 7.52 | 7.55 |
| 3 Weeks | 6.79 | 6.94 | 6.86 | 7.27 |
| 37 Days | 6.75 | 6.40 | 6.23 | 6.79 |
| | | Semi-Solid | Semi-Solid | 3% Sediment |
| 44 Days | 6.37 | | | 6.20 3% Sediment |

Comparative Examples C-105–C-114

These compositions were prepared to evaluate the effectiveness of using just MgO as an acid scavenger in various polyester polyurethane dispersions. The compositions were prepared by mixing MgO with the polyester polyurethane dispersion. The compositions are shown in Table 33 and the resulting pH data is shown in Table 34. The data show that MgO alone in these polymer systems was an ineffective stabilizer and did not perform as well as ZnO alone.

TABLE 33

| Component | C-105 | C-106 | C-107 | C-108 | C-109 |
|---|---|---|---|---|---|
| U54 | | 100 | | | |
| U53 | 100 | | | | |
| DDS3507 | | | 100 | | |
| DEP 172 | | | | 100 | |
| DEP 170 | | | | | 100 |
| MgO (phr) | 1 | 1 | 1 | 1 | 1 |

| Component | C-110 | C-111 | C-112 | C-113 | C-114 |
|---|---|---|---|---|---|
| U54 | | 100 | | | |
| U53 | 100 | | | | |
| DDS3507 | | | 100 | | |
| DEP 172 | | | | 100 | |
| DEP 170 | | | | | 100 |
| MgO (phr) | 3 | 3 | 3 | 3 | 3 |

TABLE 34

| pH | C-105 | C-106 | C-107 | C-108 | C-109 |
|---|---|---|---|---|---|
| Initial | 10.49 | 10.44 | 10.4 | 9.19 | 8.73 |
| 5 Days | 8.81 | 9.04 | 9.08 | 9.09 | 9.06 |
| 2 Weeks | 8.17 | 8.39 | 8.42 | 8.46 | 8.71 |
| 4 Weeks | 7.97 | 7.59 | 7.96 | 8.55 | 7.66 |
| 5 Weeks | 7.28 | 50% Solid | 7.87 | Solid | Solid |
| 6 Weeks | 7.58 | | 7.92 | | |
| 7 Weeks | 7.35 | | 7.85 | | |
| 8 Weeks | 7.40 | | 7.79 | | |
| 9 Weeks | | | 7.61 6% Sediment | | |

| pH | C-110 | C-111 | C-112 | C-113 | C-114 |
|---|---|---|---|---|---|
| Initial | 10.61 | 10.46 | 10.45 | 10.3 | 10.18 |
| 5 Days | 8.86 | 9.02 | 9.3 | 9.07 | 9.18 |
| 2 Weeks | 8.30 | 8.47 | 8.86 | 8.35 | 8.53 |
| 4 Weeks | 8.16 | 7.72 | 8.19 | 8.08 | Solid |
| 5 Weeks | 7.71 | 50% Solid | 7.73 50% Solid | 40% Solid | |
| 6 Weeks | 7.68 | | | | |
| 7 Weeks | 7.34 | | | | |
| 8 Weeks | 7.37 | | | | |
| 9 Weeks | | | | | |

Comparative Examples C-115–C-118 and Examples 36–40

Comparative Examples C-115–C-118 evaluated MgO as the stabilizer in systems containing polychloroprene, urethane, and butyl acrylate/methylmethacrylate copolymer. Examples 35–39 evaluated stabilizer packages of the invention in the same polymer systems. The compositions are shown in Table 35 and the results of the pH aging study are shown in Table 36. The data show that MgO combined with branched primary amino alcohol (Trisamino) and polycarbodiimide (P200) provided pH stability while MgO alone in these polymer systems was ineffective as a pH stabilizer.

TABLE 35

| Components | C-115 | C-116 | C-117 | C-118 |
|---|---|---|---|---|
| U54 | 100 | 100 | 100 | 100 |
| DDS3507 | | | | |
| AQS 1120 (phr) | 66.6 | | | |
| L735A (phr) | | 66.6 | | |
| AQS0033 (phr) | | | 66.6 | |
| AQS2S40 (phr) | | | | 66.6 |
| A310S (phr) | 4.17 | 4.24 | 4.2 | 3.83 |
| O1 640 (phr) | | | | |
| MgO (phr) | 5 | 5.09 | 5.04 | 4.59 |
| Trisamino | | | | |
| P200 (phr) | | | | |

| Components | Ex. 36 | Ex. 37 | Ex. 38 | Ex. 39 | Ex. 40 |
|---|---|---|---|---|---|
| U54 | | | | | |
| DDS3507 | 100 | 100 | 100 | 100 | 100 |
| AQS1120 (phr) | 83.25 | 83.25 | 83.25 | 83.25 | 83.25 |
| L735A (phr) | | | | | |
| AQS0033 (phr) | | | | | |
| AQS2540 (phr) | | | | | |
| A310S (phr) | 4.58 | 4.58 | 4.58 | 4.58 | 4.58 |
| O1 640 (phr) | 3.01 | 3.01 | 3.01 | 3.01 | 3.01 |
| MgO (phr) | | | 2.98 | 2.98 | 8.93 |
| Trisamino | 4.47 | 5.96 | 2.75 | 5.96 | 2.75 |
| P200 (phr) | 4.47 | 5.96 | 2.75 | 5.96 | 2.75 |

TABLE 36

| pH | C-115 | C-116 | C-117 | C-118 |
|---|---|---|---|---|
| Initial | 9.33 | 10.27 | 10.4 | 10.81 |
| 5 Days | 8.96 | 9.28 | 9.26 | 9.28 |
| 2 Weeks | 9.02 | 8.54 | 8.44 | 8.64 |
| 4 Weeks | 8.99 | Solid | Solid | Solid |
| 5 Weeks | Solid | | | |
| 6 Weeks | Paste | | | |
| 7 Weeks | | | | |
| 8 Weeks | | | | |
| 9 Weeks | | | | |
| 10 Weeks | | | | |
| 11 Weeks | | | | |
| 12 Weeks | | | | |

| pH | Ex. 36 | Ex. 37 | Ex. 38 | Ex. 39 | Ex. 40 |
|---|---|---|---|---|---|
| Initial | 8.86 | 8.98 | 8.88 | 9.06 | 8.95 |
| 5 Days | 8.28 | 8.44 | 9.08 | 9.08 | 9.13 |
| 2 Weeks | 8.24 | 8.42 | 9.03 | 9.12 | 9.15 |
| 4 Weeks | 8.15 | 8.37 | 8.97 | 8.97 | 9.09 |
| 5 Weeks | 8.08 | 8.30 | 9.03 | 9.10 | 9.17 |
| 6 Weeks | 8.05 | 8.28 | 9.03 | 9.05 | 9.10 |
| 7 Weeks | 7.75 | 8.02 | 8.88 | 8.85 40 % Solid | 8.94 |
| 8 Weeks | 7.97 | 8.27 | 9.05 | | 9.20 |
| 9 Weeks | 7.81 | 8.14 | 8.97 | | 9.13 |
| 10 Weeks | 7.63 | 7.99 | 8.86 | | 9.04 |
| 11 Weeks | 7.53 | 7.90 | 8.74 | | 8.99 |
| 12 Weeks | 7.41 | 7.86 | 8.58 | | 9.01 |

What is claimed is:

1. A pH stabilizer system for scavenging acid, minimizing hydrolysis, or both in water-dispersible polymers selected from the group consisting of acrylics, acrylates, polyesters, polyurethanes, rosin esters, polychloroprenes, chlorinated polyolefins, polyvinyl chlorides, and combinations thereof comprising:

a combination selected from the group consisting of: branched primary amino alcohol and carbodiimide; branched primary amino alcohol and fully substituted dihydroxy metal compound wherein two valences of a trivalent metal ion are substituted with hydroxyl groups; carbodiimide and fully substituted dihydroxy metal compound wherein two valences of a trivalent metal ion are substituted with hydroxyl groups; carbodiimide, branched primary amino alcohol, and magnesium oxide; branched primary amino alcohol and magnesium oxide; and a combination of carbodiimide and magnesium oxide; and a combination of branched primary amino alcohol, carbodiimide, and fully substituted dihydroxy metal compound wherein two valences of a trivalent metal ion are substituted with hydroxyl groups, wherein the branched primary amino alcohol is present in an amount of from about 0.5 to about 5 parts per 100 parts by weight polymer on a dry weight basis, the carbodiimide is present in an amount of from about 0.5 to about 5 parts per 100 parts by weight polymer on a dry weight basis, the dihydroxy metal compound is present in an amount of from about 0.5 to about 5 parts per 100 parts by weight polymer on a dry weight basis, and the magnesium oxide is present in an amount of from about 0.5 to about 5 parts per 100 parts by weight polymer on a dry weight basis.

2. The stabilizer system according to claim 1 wherein the branched primary amino alcohol is selected from the group consisting of 2-amino-2-methyl-1,3-propanediol; 2-amino-2-methyl-1-propanol; 2-amino-2-ethyl-1,3-propanediol; tris(hydroxymethyl)aminomethane; and combinations thereof.

3. The stabilizer system according to claim 1 wherein the dihydroxy metal compound is selected from the group consisting of dihydroxyaluminum aminoacetate, dihydroxyaluminum sodium carbonate, and combinations thereof.

4. The stabilizer system according to claim 1 wherein the carbodiimide is aromatic or aliphatic.

5. The stabilizer system according to claim 1 wherein the carbodiimide comprises (poly(nitrilomethanetetraylnitrilo (2,4,6-tris(1-methylethyl)-1,3-phenylene)).

6. The stabilizer system according to claim 1 wherein the weight ratio of primary amino alcohol to carbodiimide is about 1:1.

7. The stabilizer system according to claim 1 wherein the weight ratio of branched primary amino alcohol to dihydroxy metal compound is about 1:1.

8. The stabilizer system according to claim 1 wherein the weight ratio of branched primary amino alcohol to carbodiimide to magnesium oxide is about 1:1:1.

9. A pH stabilized composition comprising:

a water-dispersible polymer selected from the group consisting of acrylics, acrylates, polyesters, polyurethanes, rosin esters, polychloroprenes, chlorinated polyolefins, polyvinyl chlorides, and combinations thereof; and an effective amount of a stabilizer system comprising a combination selected from the group consisting of: branched primary amino alcohol and carbodiimide; branched primary amino alcohol and dihydroxy metal compound; carbodiimide and dihydroxy metal compound; carbodiimide, branched primary amino alcohol, and magnesium oxide; branched primary amino alcohol and magnesium oxide; carbodiimide and magnesium oxide; and a combination of branched primary amino alcohol, carbodiimide, and dihydroxy metal compound, wherein the branched primary amino alcohol is present in an amount of from about 0.5 to about 5 parts per 100 parts by weight polymer on a dry weight basis, the carbodiimide is present in an amount of from about 0.5 to about 5 parts per 100 parts by weight polymer on a dry weight basis, the dihydroxy metal compound is present in an amount of from about 0.5 to about 5 parts per 100 parts by weight polymer on a dry weight basis, and the magnesium oxide is present in an amount of from about 0.5 to about 5 parts per 100 parts by weight polymer on a dry weight basis.

10. The stabilized composition according to claim 9 wherein the polymer is in the form of an aqueous dispersion.

* * * * *

UNITED STATES PATENT AND TRADEMARK OFFICE
CERTIFICATE OF CORRECTION

PATENT NO. : 6,444,737 B1
DATED : September 3, 2002
INVENTOR(S) : Rayner, Terry J.

It is certified that error appears in the above-identified patent and that said Letters Patent is hereby corrected as shown below:

<u>Title page,</u>
Item [56], References Cited, FOREIGN PATENT DOCUMENTS, delete "JP   3-302315" and insert in place thereof -- JP   8-302315 --.

Signed and Sealed this

Eighteenth Day of May, 2004

JON W. DUDAS
*Acting Director of the United States Patent and Trademark Office*